US012633579B2

(12) United States Patent (10) Patent No.: US 12,633,579 B2
Bloomstein (45) Date of Patent: May 19, 2026

(54) STACKABLE BATTERY CELLS WITH INDIVIDUAL CELL MANAGEMENT

(71) Applicant: Massachusetts Institute of Technology, Cambridge, MA (US)

(72) Inventor: Theodore Bloomstein, Medford, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 394 days.

(21) Appl. No.: 18/183,548

(22) Filed: Mar. 14, 2023

(65) Prior Publication Data

US 2024/0014454 A1      Jan. 11, 2024

Related U.S. Application Data

(60) Provisional application No. 63/269,285, filed on Mar. 14, 2022.

(51) Int. Cl.
*H01M 10/42*       (2006.01)
*H01M 10/46*       (2006.01)
(Continued)

(52) U.S. Cl.
CPC ......... *H01M 10/425* (2013.01); *H01M 10/46* (2013.01); *H01M 10/482* (2013.01); *H01M 10/486* (2013.01); *H01M 50/242* (2021.01); *H01M 50/509* (2021.01); *H01M 50/533* (2021.01); *H01M 50/569* (2021.01);
(Continued)

(58) Field of Classification Search
USPC ........................................................ 320/121
See application file for complete search history.

(56) References Cited

U.S. PATENT DOCUMENTS

2008/0171255 A1* 7/2008 Brantley ............. H01M 8/2404
429/480
2015/0295289 A1* 10/2015 Young .................... H01M 8/10
429/405
(Continued)

OTHER PUBLICATIONS

Zhu, "Identification of Lithium Ion Battery Electrode Structural Inhomogeneity and Its Effect on Battery Performance"; 60th Annual Report on Research 2015; 2015; 5 pages.
(Continued)

*Primary Examiner* — Mohammed Alam
(74) *Attorney, Agent, or Firm* — Daly, Crowley, Mofford & Durkee, LLP

(57) ABSTRACT
A battery array comprising a plurality of batteries. Each battery comprises a plurality of stacked battery cells, wherein the battery cells have varying properties. Each battery cell comprises an anode layer; a cathode layer; an ion conducting membrane positioned between the anode layer and the cathode layer; a top layer; a bottom layer; and circuitry disposed on the top layer, bottom layer, or both. The circuitry comprising one or more first circuits for monitoring or controlling the battery cell. Further, the battery comprises a battery control circuit configured to provide electrical interface connections with the circuitry. The battery array comprises a battery array control circuit configured to provide electrical interface connections with the battery control circuits of each battery.

20 Claims, 17 Drawing Sheets

100

(51) Int. Cl.
    *H01M 10/48*       (2006.01)
    *H01M 50/242*     (2021.01)
    *H01M 50/509*     (2021.01)
    *H01M 50/533*     (2021.01)
    *H01M 50/569*     (2021.01)
    *H02J 7/00*        (2006.01)

(52) U.S. Cl.
    CPC .......... *H02J 7/0029* (2013.01); *H02J 7/0047*
        (2013.01); *H01M 2010/4271* (2013.01)

(56) References Cited

U.S. PATENT DOCUMENTS

2019/0363324 A1 * 11/2019 Liu ..................... H01M 50/507
2024/0014454 A1 * 1/2024 Bloomstein ........... H02J 7/0029

OTHER PUBLICATIONS

Yu et al., "Travelling-wave thermoacoustic electricity generator using an ultra-compliant alternator for utilization of low-grade thermal energy"; Elsevier; Applied Energy 99 (2012); Jun. 2012; 11 pages.

Goutam et al.; "Three-Dimensional electro-thermal model of li-on pouch cell: Analysis and comparison of cell design factors and model assumptions"; Science Direct; Applied Thermal Engineering; vol. 126, No. 5; Nov. 2015; 7 Pages.

Infineon; "Battery Management Systems (BMS)—Infineon Technologies"; 12 Pages.

Schweber; "Why and How to Use Battery Management ICs for Stacked Cells"; Digi-Key Electronics; Jan. 19, 2022; 14 Pages.

Synopsys; "What is a Battery Management System?"; 14 Pages.

Timmer et al.; "Review on the conversion of thermoacoustic power into electricity"; The Journal of the Acoustical Society of America; vol. 143; Feb. 9, 2018; 18 Pages.

Hail et al.; "An Internally pressurized aerostatic journal bearing for thermoacoustic engines"; Tribology International; vol. 99; Jan. 4, 2016; 8 Pages.

Ito et al.; "Study of the Contraction Characteristics of a Large-scale Stacked-type Electrostatic Actuator"; IECON 2013-39$^{th}$ Annual Conference of the IEEE Industrial Electronics Society; Nov. 10, 2013; 6 Pages.

Nouh et al.; "Energy Harvesting of Thermoacoustic-Piezo Systems With a Dynamic Magnifier"; Journal of Vibration and Acoustics; vol. 134; Dec. 2012; 10 Pages.

Rein et al.; "Diode fibres for fabric-based optical communications"; Nature; vol. 560; Aug. 9, 2018; 17 Pages.

Wang et al.; "Lithium ion battery structure that self heats at low temperatures"; Nature; vol. 529; Jan. 28, 2016; 9 Pages.

Zhang, et al.; "Design and Control of a Fish-like Robot Using an Electrostatic Motor"; IEEE International Conference on Robotics and Automaton; Apr. 2007; 6 Pages.

* cited by examiner

300

Battery Core Cell 2-layer flex
board, 302

Anode foil
304

Separator
306

Cathode
foil
308

2-layer flex
board, 310

320

Battery Monitoring and Control 2-layer Flex-board

Contacts, 322

Heater, 324

Temp sensors, 326a 326b

336

Central cooling channel, 328

Strain relief, 330

In-plane stress sensor, 332

Out-of-plane stress sensors & strain relief, 334

552

550

530

Insulation 534

BMS contacts 536

Control ASICs 538

Flex-board contacting petals 540

544

Battery stack 542

Spacer 544

996a 940a
936a
932a
935a
912a
934a
938a
942a

996b 940b
935b
942b

STACKABLE BATTERY CELLS WITH INDIVIDUAL CELL MANAGEMENT

CROSS REFERENCE RELATED SECTION

This application claims the benefits of U.S. Provisional Application No. 63/269,285, filed on Mar. 14, 2022. The entire contents of these applications are incorporated herein by reference.

STATEMENT REGARDING FEDERALLY SPONSORED RESEARCH

This invention was made with government support under FA8702-15-D-0001 awarded by the U.S. Air Force. The government has certain rights in the invention.

BACKGROUND

Batteries directly combine storage and conversion, placing special constraints on the degree capacity, discharge rate, temperature window, lifetime and safety can be independently optimized. Batteries are formed from one or more electrochemical cells, which share a common inlet and outlet terminal for electron flow. An electrochemical cell is a reaction chamber specifically configured to convert a chemical reaction between a fuel and oxidant directly into electricity rather than heat.

Power is extracted from the exchange of charged particles. Most commonly, the electron and ion flows are forced to follow different physical pathways, using separate electrically conducting current collectors and ion-conducting salt bridges. Ion transfer occurs through mechanisms such as hopping or diffusion at orders of magnitude lower than effective mobilities.

Although different configurations exist, often the anode and cathode are fixed materials physically separated but allowed to exchange charged particles, forcing the reaction to follow oxidation and reduction (i.e. charge transfer) reactions rather than a thermochemical (i.e. combustion) conversion mechanism. The cathode refers to the material that undergoes reduction during discharge and oxidation during charging. The anode is oxidized during discharge and reduced during charging. The ion bridge is a membrane, in addition to blocking electron flow, serves to both physically separate the anode and cathode from contacting.

The actual active material thickness may be tailored to the electron and ion conducting requirements, as well as performance metrics such as capacity, and discharge rate. Although variations exist on material thicknesses depending on the specific chemistry employed, the electrochemical cell is generally a planar device due to the constraints on electron and ion conductivity in the active materials and membranes, as well as additional mechanical handling constraints.

Due to the planar nature, capacity may be built up by rolling or folding the stacked structure, leading to the common cylindrical, prismatic, and pouch cell form-factors. Following, the system can be viewed as several different parallel connected cells, each producing charged particles at slightly different potential energy, as a consequence of the different barriers to reaction.

However, this architecture promotes concentration, temperature and stress gradients. Common methods used to monitor, compensate or manage losses, such as adding active thermal control or state of health circuitry, may be integrated at the battery level. However, the architecture is also prone to single point failures. A short through the spacer can deplete the entire battery, or lead to even more catastrophic effects since all the cells share common output electrodes if the resulting temperature rise leads to cascading exothermic decomposition reactions.

Rechargeable batteries provide a regulated output, but the absolute levels, such as total capacity, peak power, and ultimately number of charging, are highly dependent on operating conditions. For instance, as batteries rely on a thermally activated process to convert chemical energy to electron flow, battery performance can fall by 3-5× over the broad temperature range required in military critical systems. In applications requiring extended durations, only a small fraction of battery capacity may be used, since recharge cycle life is strongly dependent on depth of discharge.

SUMMARY

This disclosure relates to batteries and, more particularly stacking and interconnection of batteries and battery cells to improve battery performance. Disclosed herein is a battery structure, constructed from battery cells that each incorporate electrical circuitry, thermal management components, and stress isolation features to control operating conditions both within and between adjacent cells. The battery structure further includes one or more battery management tiers (or "layers"), an internal bus for routing power and control signals between electrochemical cell, and environmental enclosures including external interconnects.

DESCRIPTION OF THE SEVERAL VIEWS OF THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principals of the concepts described herein. Like reference numerals designate corresponding parts throughout the different views. Furthermore, embodiments are illustrated by way of example and not limitation in the figures, in which.

DETAILED DESCRIPTION

Figure 1:
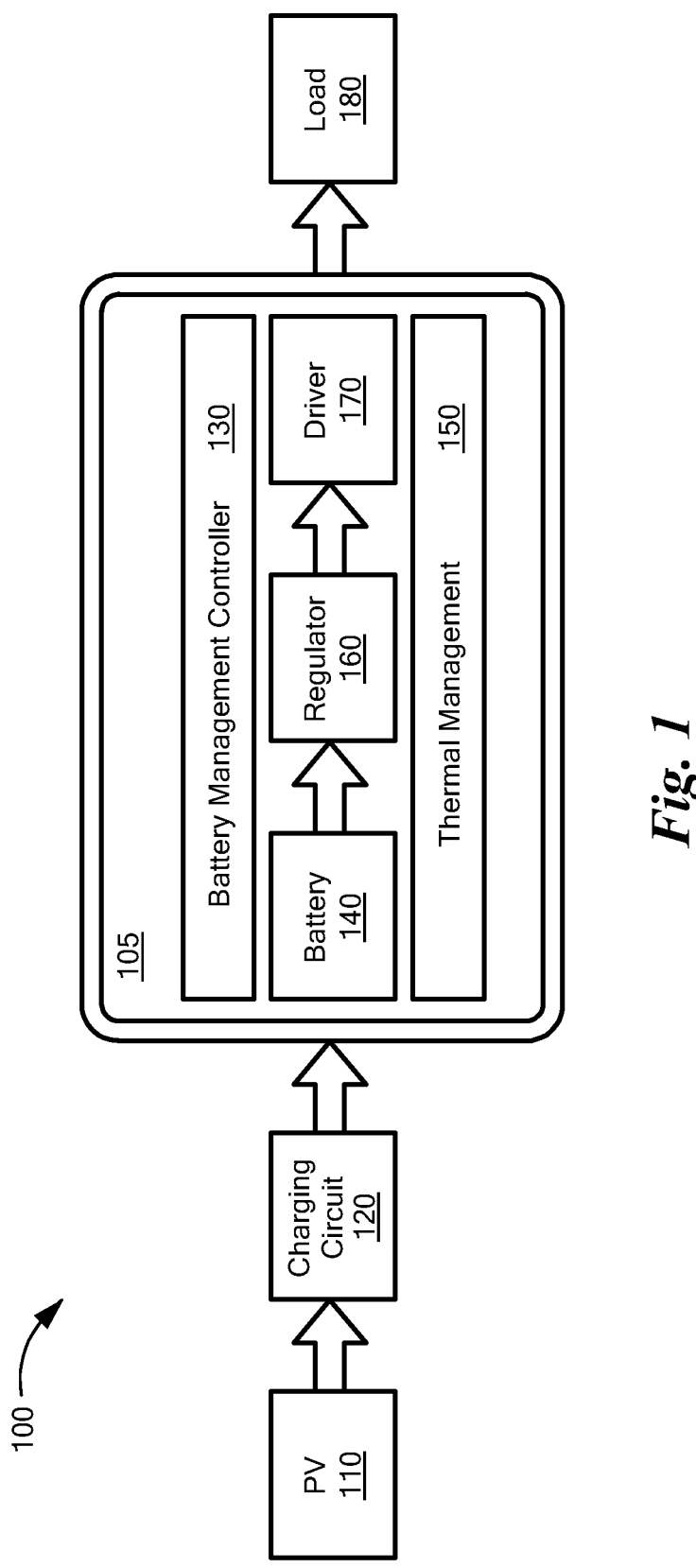
FIG. 1 is a block diagram of a system in which embodiments of the present disclosure may be provided.

Disclosed herein are structures and techniques for providing batteries and arrays with individually managed, stackable cells. In some embodiments, a battery management circuit can provide supervisory functions, communicate with a battery pack (or "array") manager, and makes additional system measurements. For example, a battery management circuit can compare certain values against reported data from individual cells to decide when to switch cells in and out to provide a degree of regulation or remove a faulty cell from the power path. Such values may include those rates associated with the temperature or physical stress of the battery. In some embodiments, a power and data bus may connect each cell to an associated battery management tier, which in turn may be connected to a battery management system (BMS).

In some embodiments, battery capacity may be built up in a manner similar to object layered manufacturing. Each battery layer may include one or more cells and each cell can have its own cell management system (CMS) controller. A CMS according to the present disclosure may function similar to a traditional BMS, but may be designed to not occupy a large amount of real estate to provide better spatial fidelity for controlling internal operating conditions. In some cases, a layer can have a single cell with multiple CMS controllers to provide redundancy and spread out power distribution to minimize current crowding (creating concentration gradients particularly at high discharge rates) in a cell using a single tap. The cells within a layer can be connected in series so as to build up a higher voltage, or in parallel.

In some cases, all cells within a layer can have the same chemistry and material thickness (i.e. reaction rate kinetics and transport rate dynamics) whereas different layers within a battery can be constructed from different battery chemistries or have different thicknesses. In some cases, different cells within a layer could be constructed with different battery chemistries and/or thicknesses. As battery losses are primarily driven by ion conduction losses through the salt bridge, thicker cells have more active material per salt bridge surface area, allowing higher capacity, but increased Joule heating losses. Batteries which have more ion bridge surface area have lower losses, but less active anode and cathode material.

Battery capacity can be realized by stacking layers, with power and status information flowing vertically. Thus, if a layer has N (e.g., N=6) CMS controllers, then there may be N separate vertical busses. In some cases, a single BMS (e.g., located at the top most portion of the battery) may be configured to have sufficient processing power resources to monitor all N busses. In other cases, multiple BMS circuits/processors may be used.

Multiple batteries can be connected in series or parallel, with each BMS within a battery exchanging status and control information with a host control circuitry along a common interface connection. The BMS and its conditioning, switching, and regulation circuitry may be integrated within a battery. Thus, each battery may be readily switched in and out of a pack for instance if a faulty condition is detected in a battery. The battery layers can be housed in an environmental enclosure, which may also provide interconnections to other batteries, pack manager, sources, and loads, as well as additional safety features to augment those built in at the cell level.

Disclosed batteries may be constructed with a plurality of symmetric electrochemical cells connected in parallel or in series within a layer. The active anode, separator, and cathode are sandwiched between current collectors. The current collectors may be overlaid with thin film sensor and heating elements to provide higher fidelity monitoring and control with higher temporal response compared to a battery where sensors are external. Also, the cell architecture is constructed to allow the active battery materials within a cell to sandwiched between phase change material to limit temperature excursions during brief periods of high discharge rates. By placing the phase change material directly over the entire cell span rather than externally along the perimeter, thermal gradients are minimized further. When multiple batteries are used within a system, the cell and battery management tiers can be utilized to protect the battery and isolate damaged cells. Such circuitry may also be incorporated at the battery level to potential pass-through voltages and currents as a second layer of protection.

The structures and techniques disclosed herein provide a general architecture that can be used to design/build a battery to a targeted capacity in a deterministic fashion. Such a battery may include one of more of the following features: a stack of electrochemical cells, each augmented with thermal, stress, as well as electronic switching; regulation and control; battery management tiers; internal bus for routing power and control signals between electrochemical cell and battery management tiers; and environmental enclosure including external interconnects.

In some embodiments, balancing circuitry can be used to route current around a fully charged cell in a string, enabling subsequent cells to be charged. In some cases, the balancing circuitry can be embedded in the cells, allowing for the production of high voltage rechargeable piles that are more compact than currently possible. The ability to dynamically cycle cells in and out of the string during discharge provides a means to a more constant output voltage to minimize the losses when using a simple drop-out regulator in applications requiring constant input voltages.

A general cell management architecture described herein presents a deterministic method to increase battery capacity, independent of battery chemistry, while extending the temperature window, and trade between discharge rate, depth of discharge and recharge cycles. In disclosed examples, charge control, and thermal and stress management may be performed at the individual cell level prior to packaging.

Disclosed structures and techniques can be used to ensure that each cell operates under its own optimized environmental conditions and to ensure predictable thermal and stress cross-talk and minimal charge imbalances between cells. In this manner, individual cells may added allowing capacity to be built up in a deterministic fashion compared to conventional rolling, stacking, or folding techniques. Both passive and active circuitry may also be included to bypass a faulty cell, to ensure a single short does not discharge the battery. A flexible interconnection scheme may be used to allow different cells to be combined in different combinations of parallel and series connections to tailor the specific current and voltage discharge characteristics of the battery.

By allowing cells to be stacked and individually balanced in series prior to packaging, a more compact rechargeable battery pile (e.g., a stack of series-connected cells) may be produced compared to implementations requiring stacks of batteries and external balancing circuitry. In applications requiring higher voltages than the electrochemical cell voltage (typically 3-4.5V in lithium-ion chemistries), it may be preferable to build up capacity using parallel connected high voltage battery piles rather than series connected high current batteries per unit volume. With parallel connected batteries, and in contrast with series-connected batteries, a single fault in an individual battery does not result in failure of the entire array. Thermal management may also be simplified as a result of reduced losses. Each series connected battery may operate at a higher current leading to larger Joule heating losses while the piles may operate at correspondingly lower currents.

In some embodiments, thermal range and lifecycle requirements can also be tailored by combining cells with different optimized properties, themselves connected in different series or parallel combinations. This approach can be used to achieve a specific voltage and current requirement without additional packaging overhead. By allowing storage and charge recycling to be optimized at the cell level without packaging overhead, and an ability to interconnect cells in more efficient circuit topographies, structures and techniques disclosed herein enable disruptive advances in battery powered systems, independent of battery chemistry.

FIG. 1 shows an example of a system in which embodiments of the present disclosure may be provided/utilized. An illustrative system 100 includes an energy source 110, a charging circuit 120, a battery pack 105, and a load 180 (e.g., a current or voltage load). Battery pack 105 can include one or more batteries 140, a battery management control circuit 130, a thermal management module 150, a regulator 160, and a driver 170. The various elements of system 100 may be connected as shown in FIG. 1 or any other suitable manner.

Energy source 110 and charging circuit 120 can collectively be configured to provide power to battery pack 105 for the charging thereof. As shown in FIG. 1, energy source 110 may be a solar photovoltaic (PV) energy harvesting source or other "clean" energy source. In other embodiments, other types of power sources may be used to charge the battery. Battery pack 105 may provide power to load 180. Battery pack 105 may be selectively disconnected from energy source 110 and charging circuit 120, and/or from load 180, as desired.

Battery pack 105 may be described as a battery pack, but in some embodiments may be described as battery array. Battery pack 105 may include a single battery or multiple batteries. Thermal management module 150 can be coupled to the battery to provide heating and cooling to individual cells. Battery management control circuit 130 can receive signals from the batteries 140, such as temperature and physical stress, and control the heating and cooling circuits so the cells operate efficiently while charging and/or powering a load. Regulator 160 and driver 170 can be configured to regulate and shape the output of the batteries 140. The batteries 140 may be formed of individually managed, stackable cells according to structures and techniques described in detail below. Likewise, battery management control circuit 130 may utilize various structures and techniques described herein below.

Figure 2:
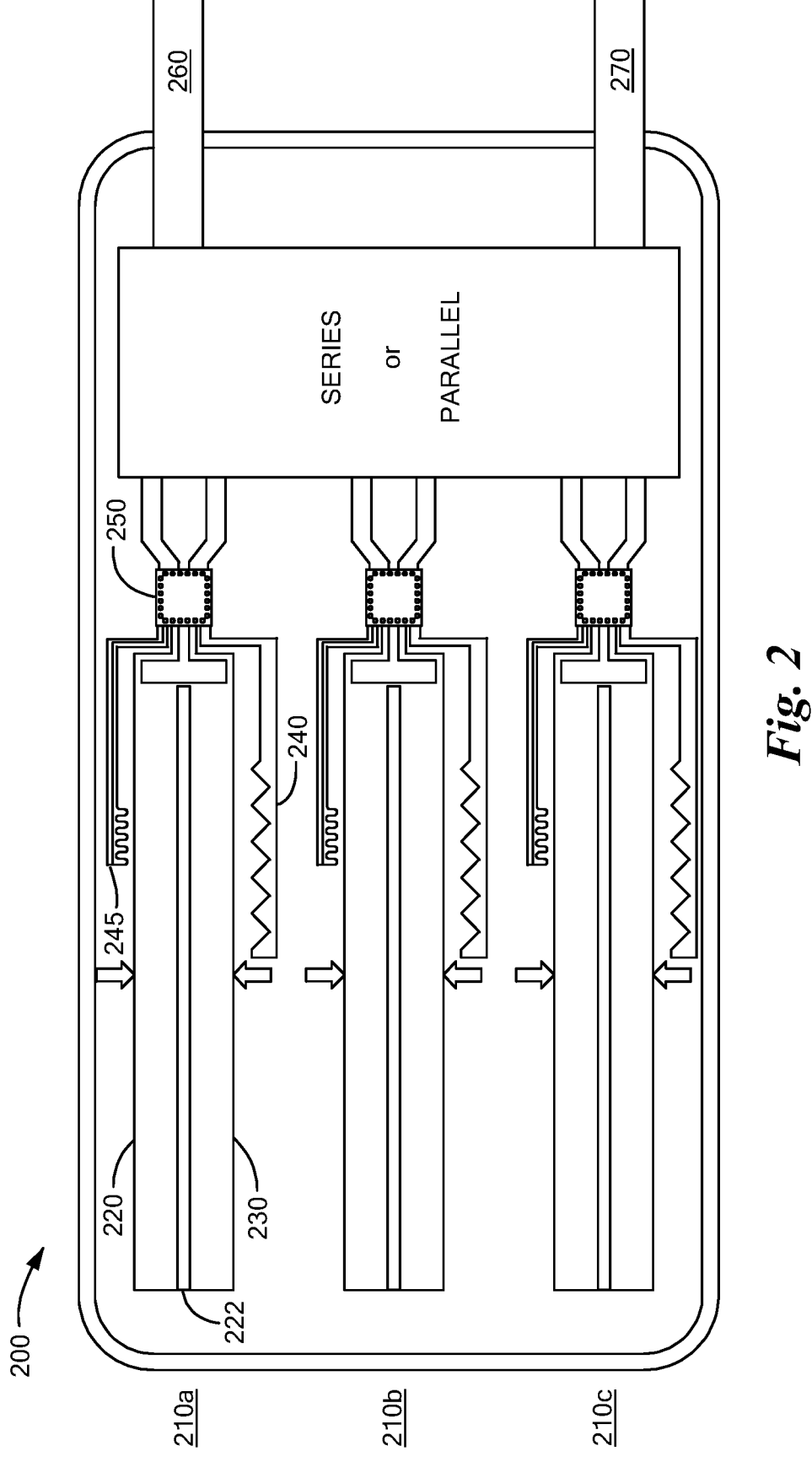
FIG. 2 is a schematic diagram of a battery having individually managed stacked cells, according to some embodiments.

FIG. 2 shows an example of a battery (or a layer thereof) having individually managed stacked cells, according to embodiments of the present disclosure. An illustrative battery 200 can include a plurality of cells 210a, 210b, 210c (210 generally) arranged in a stack. To promote clarity in the drawings, only three cells are shown in FIG. 2, however other numbers of cells may be provided. The representative cell 210a can include a cathode 220, an ion conducting material 222, an anode 230, an integrated cell management circuitry 250, a heating element 240, and one or more sensors 245 more measuring temperature or strain. The other cells 210b, 210c may include similar elements. The cell management circuitry 250 can include analog and/or digital circuitry configured to monitor and control the cell 210a on an individual basis, as discussed in more detail below. Heating element 240 may include a conductive path (e.g., a wire/trace arranged in a serpentine pattern) configured for connecting to the cell management circuitry 250 (for instance through the flex board 320 disclosed in FIG. 4 or the heater metallization 996a, 996b in FIG. 9B) and configured to manage thermal loads in the cell 210a.

A battery 200 can further include an input terminal 260 connected to the cathode 220 of the cell 210a and an output terminal 270 connected to the anode 212 of cell 210c, where the cells 210a, 210c may correspond to the top and bottom cells in the stack, respectively. The cells 210 may be coupled in series or parallel depending on the voltage and current output that is desired from the battery 200, with the series/parallel connections omitted in FIG. 2 for clarity.

In the case where cells 210 are connected in series, a bypass switch may be incorporated to divert the charging current to subsequent cells in the stack when a cell reaches is maximum charging voltage. This operation, typically referred to as balancing, is required to compensate for any mismatches in cell impedances that can alter charging rates.

Figure 3:
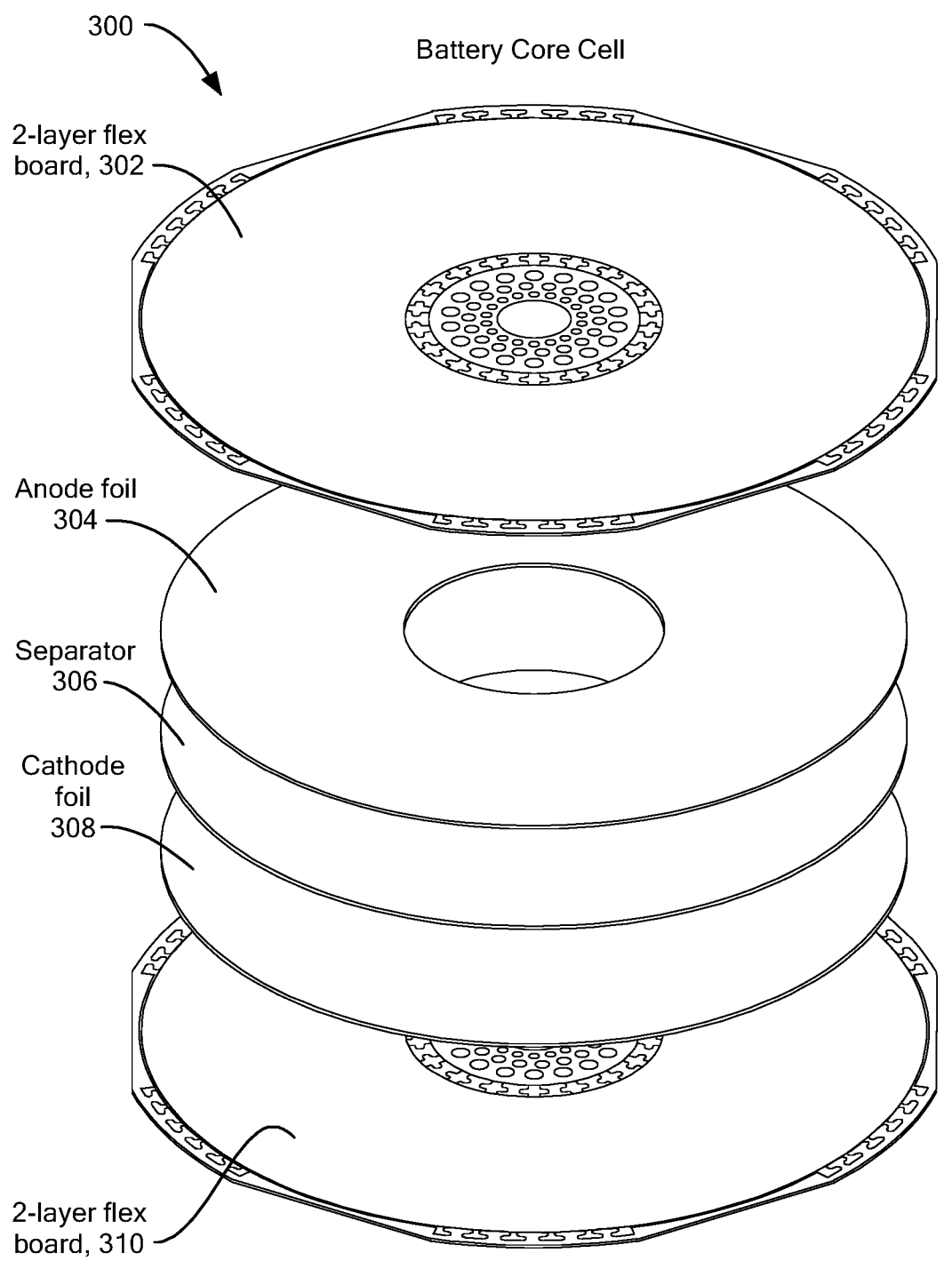
FIG. 3 is an exploded view of a stackable battery cell, according to some embodiments.

FIG. 3 depicts an individually managed, the stackable battery cell 300, according to some embodiments. A cell 300 may be provided as a part of a battery (e.g., the battery 200 of FIG. 2) having multiple cells in a stacked arrangement. An illustrative cell 300 may include a first flex board 302, an anode layer 304, separator layer 306, a cathode layer 308, and a second flex board 310. The layers 302-310 may be arranged as shown in FIG. 3 or in any other suitable arrangement.

The anode layer 304 may be formed from a variety of materials, including but not limited to: natural, artificial, or composite graphite, graphene, activated carbon, lithium titanate, or any other material suitable for an anode in a single-use or rechargeable battery. Cathode layer 308 may be formed from a cathode active material such as NMC, NCA, LMO, LCO, or any other material suitable for a cathode in a single use or rechargeable battery. In some embodiments, the cathode layer 308 may further include a binder material and/or a foil material. In an embodiment, the cell 300 may be a rechargeable lithium-ion battery, and the anode layer 304 and cathode layer 308 may be formed from suitable materials to form the lithium-ion battery.

Separator layer 306 may provide electrochemical separation between the anode layer 304 and the cathode layer 308. In embodiments, separator layer 306 may be an ion conductor that allows ions to flow between the anode layer 304 and the cathode layer 308, to effectuate the chemical reaction within the cell 300 that produces its electrical output.

The first flex board 302 and/or second flex board 310 may include a flexible substrate upon which various conductive paths (or "traces") are printed, deposited, etched, or otherwise formed. An electrical load or source can be connected to the first flex board 302, second flex board 310 or both. As previously discussed, the cell 300 may be one of multiple cells arranged in a stack to form a battery. In this case, one of both of the flex boards 302, 310 may be electrically connected to flex boards of other cells in the battery (e.g., using contacting petals as described below in the context of FIG. 4). The voltage of the battery may be determined based on the number and type of stacked cells within the battery.

The cell design illustrated in FIG. 3 is merely one example of an individually managed battery cell that can be provided according to the general structures and techniques disclosed herein. Another example is described below in the context of FIGS. 8 and 9A, 9B and 9C.

Figure 4:
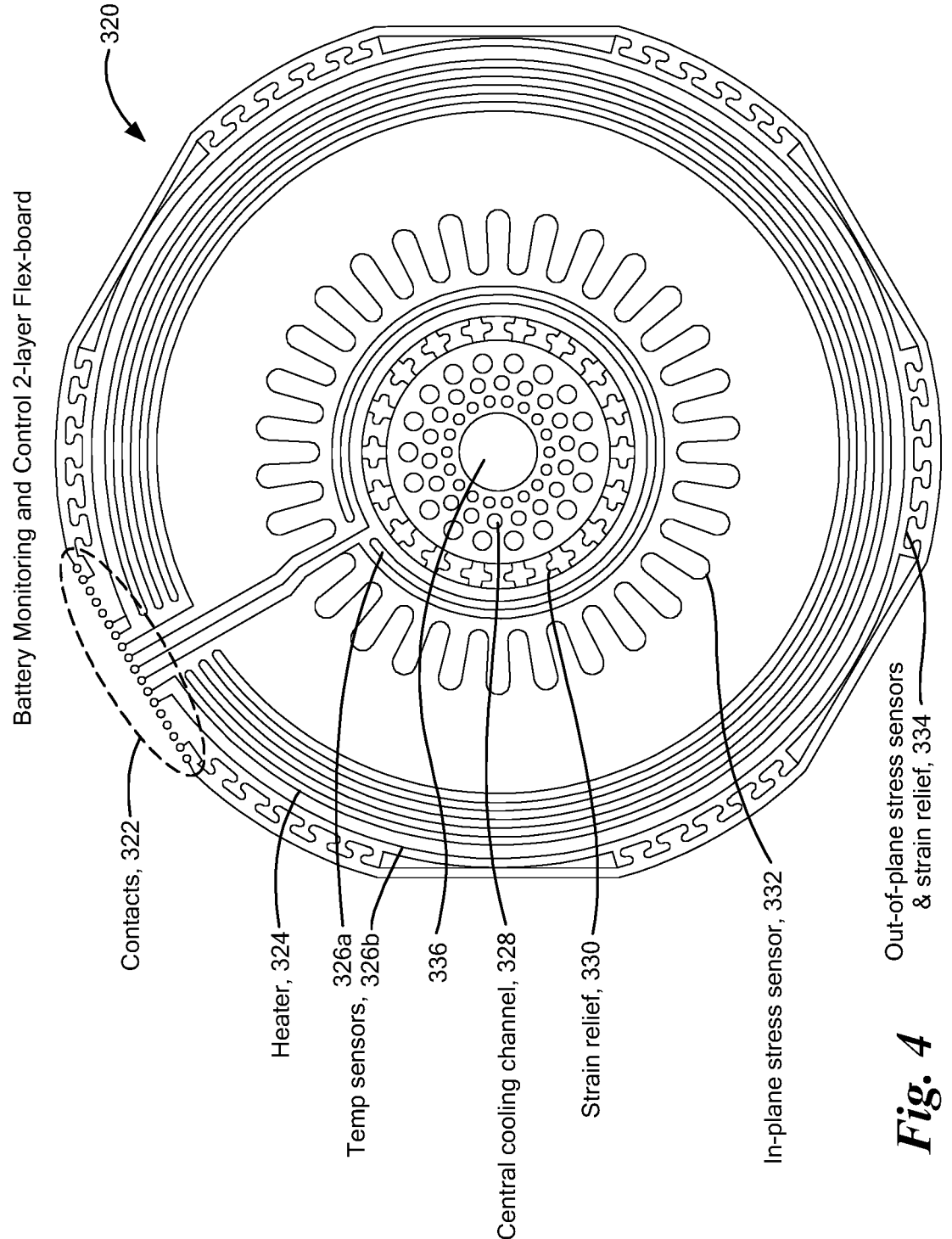
FIG. 4 is a top view of a flex board that may be provided within the stackable battery cell of FIG. 3.

Referring to FIG. 4, an illustrative flex board 320 may be the same as or similar to the first flex board 302 or second flex board 310 of FIG. 3. The flex board 320 may include a plurality of contacts 322, a heating element 324, temperature-sensing elements 326a, 326b, a cooling channel 328, a strain-relief element 330, an in-plane stress sensing element 332, and out-of-plane stress sensing and the strain-relief element 334. Various such elements (e.g., heating element 324) may be provided as conductive paths (e.g., wires/or traces) arranged in a serpentine structural pattern on the surface of the flex board 320, such as shown.

Flex board 320 may be formed PCB, fabric, or a similar material that can include metal layers and etchings to provide electrical connections to the cell. These electrical connections can be used to provide output power, input power for charging the cell, and/or control signals supplied to a control circuit (e.g., control application-specific integrated circuits, ASICs, 438 in FIG. 4) for controlling temperature and strain of the cell.

Contacts 322 can be used to electrically connect the cell 300 to other cells, etc. Contacts 322 can be used to provide output power, input power for charging the cell, and/or control signals. The control signals may be supplied to a control circuit for controlling temperature and strain of the cell. Through this architecture, each cell may be individually contacted. The flex board traces/circuitry can be arranged in a manner similar to that shown in FIG. 4, or in any other manners suitable for relieving stresses and limiting buckling, promoting film adhesion, and/or efficiently conducting heat out of the battery to enable higher discharge currents. Examples of these traces are shown in FIG. 4 and will be discussed below.

Heating element 324 can be provided to regulate the temperature of the cell 300. Batteries may not operate efficiently if they are too cool or too hot. Thus, for example, electrical current may be driven through the heating element 324 to increase the temperature of the cell 300 if it is too cold. In an embodiment, the heating element 324 may comprise a long, resistive trace that produces waste heat when a current is run through it. An adjustable current source may be coupled to the heating element 324 to drive the current. The electrical waste heat can be used to heat cell 300 to increase its operational efficiency.

In some embodiments, an electrochemical cell can be self-heated by redirecting its output through one or more embedded heating elements, such as the heating element 324 illustrated in FIG. 4. Different arrangements/layouts of heating elements can be employed to heat different portions of a cell. In the case where multiple heating elements are provided, the order in which different heating elements are used can be changed to smooth out variations in material degradation over repeated use.

Cooling channel 328 may comprise a heat sink, connections to a heat sink, and/or a thermally conductive trace that can be coupled to a cooling source. The cooling source may be controlled by a control circuitry external to or housed within the battery, for example. In some embodiments, the control circuit may be provided as an ASIC.

Temperature-sensing elements 326a, 326b may include one or more temperatures sensing diodes, or other circuit elements that can be used to determine the temperature of the cell 300. The temperatures sensing elements 326a, 326b may be coupled to control circuitry that can read the temperature of the cell 300.

In an embodiment, flex board 320 may include a metal layer to form a contact with the cell's anode layer 304 or cathode layer 308, a metal layer that includes a piezoresistive strain gauge, and/or a metal layer that includes a strain gauge resistor. In embodiments, some or all of these layers may be omitted and other layers that include other connectors or circuitry may be added to the flex board 320.

A control circuit may be coupled to the temperature-sensing elements 326a, 326b, the heating element 324, and the cooling channel 328 via a plurality of contacts 322 to control the temperature of the cell 300. As noted above, a battery cell may not operate efficiently if it is too hot or too cold. By controlling the temperature of the cell 300, control circuit may keep the cell 300 at a temperature that provides more efficient operations. In addition, the temperature of each cell 300 in a battery may be individually controlled. Efficiency of the entire battery may be increased by controlling the temperature of each individual cell rather than controlling the temperature of the entire battery.

By incorporating heating elements and channels for convective cooling, multiple different cells of battery can operate with the same thermal profile. Stresses may also be reduced by adopting a loosely stacked structure, to allow space for volumetric changes during plating and intercalation. In comparison, traditional batteries formed by tightly winding or folding a single cell deposited between a pair of ribbon based current collectors experience large variations in temperature and stress which ultimately degrade lifetime and performance.

Strain-relief element 330, in-plane stress sensing element 332, and/or the out-of-plane stress sensing and strain-relief elements 334 may be electronically controlled to reduce physical strain, and thus, increase cell efficiency. Stresses may also be reduced by adopting the stacked structure disclosed herein, to allow space for volumetric changes during plating and intercalation. The stress sensing element 332 may provide signals to a control circuitry indicating the amount of physical strain that the cell 300 is under. In more detail, the path length of stress sensing element 332, and thus its resistance, may vary in response stress. A Wheatstone bridge or other type of circuit may be used to measure such changes in resistance. Physical strain on the cell 300 can be controlled by activating the strain-relief elements 334 in response to detecting excess strain using the stress sensing element 332. In certain instances, the control circuitry may also adjust the temperature of the cell 300 (as described above) to reduce physical stress on the cell 300.

In embodiments, the layers of the cell 300 may be substantially circular in shape. Following, the resulting battery may also be circular in shape. In addition, the cell 300 may include hole 336 in the center. The hole 336 may be extend through the layers. The hole 336 in the middle of the layers enables the layers to be stacked onto a spindle, which may aid in assembly and manufacturing of the battery.

Figure 5:
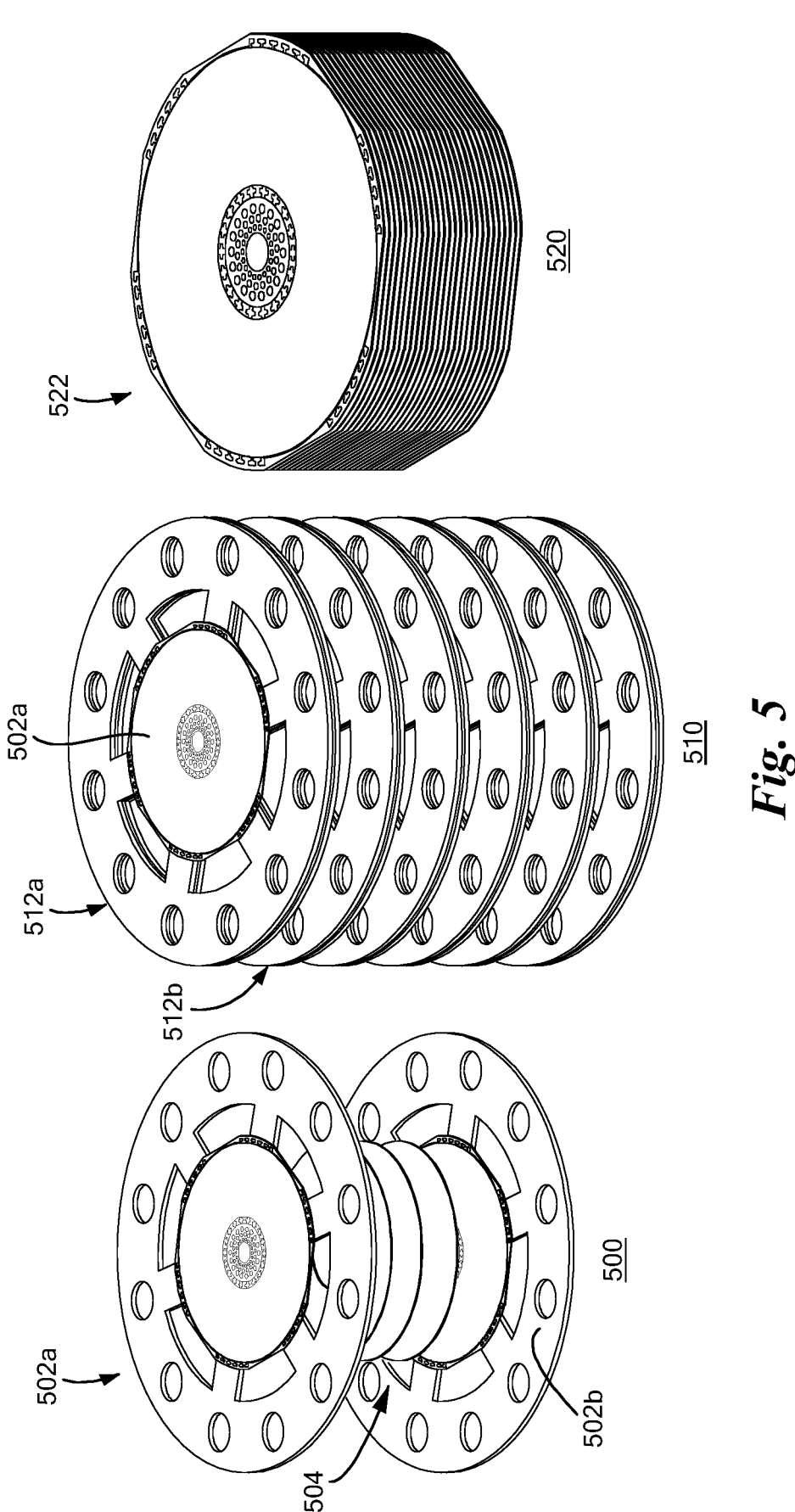
FIG. 5 illustrates a process for manufacturing a battery from multiple battery cells, according to some embodiments.
Figure 5:
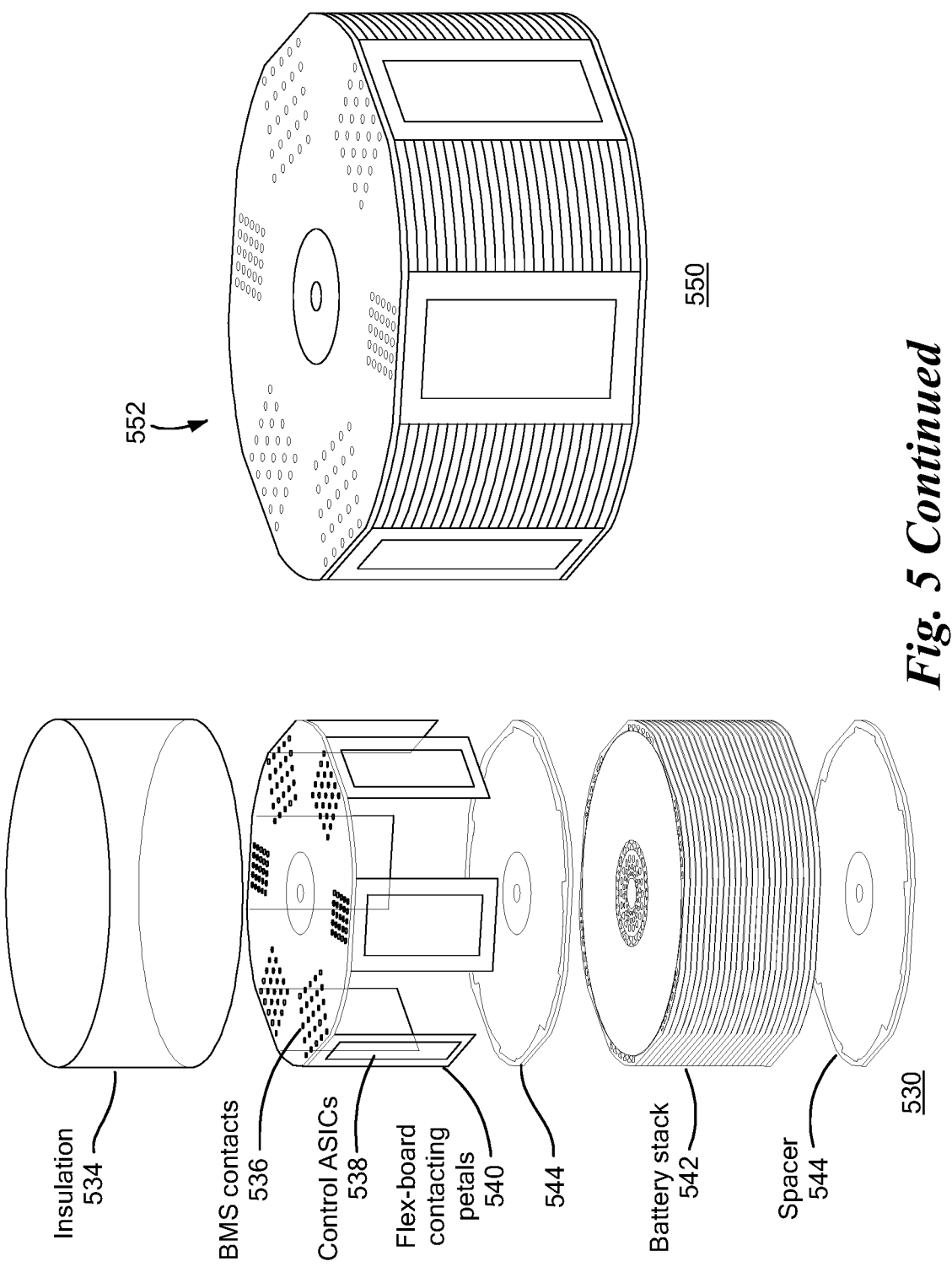

FIG. 5 illustrates a process for manufacturing a battery from multiple battery cells, according to some embodiments. The process is shown using the battery/cell design of FIGS. 3 and 4. While a detailed description of each step is provided below, briefly the process can include: a first step 500 of assembling the cells; a second step 510 of arranging multiple cells together into a stack; a third step 520 of cutting away cell scaffolding; a fourth step 530 of assembling the stack with integrated control circuitry. By following the steps portrayed in FIG. 5, an illustrative battery 552 can be produced at 550.

Referring to step 500, to form an individual cell, the battery foils 504 are coupled with two-layer flex boards 502a and 502b. Multiple cells with the scaffolds 512a, 512b are stacked together to form a stack of cells. Scaffolds 512a, 512b, which may be formed of the same materials and layers as the flex board, are provided for ease of handling and can be subsequently removed. In some embodiments, a number of six scaffoldings are shown but more may be used. Each cell may include one or more scaffolds to assist in stacking.

At step 510, the cell stack is created. The number and type of cells can be selected to achieve a desired voltage, among other battery characteristics. Each cell may be at least 2500 nm thick, when accounting for the spacer, backplane, counter electrode and flexure mounts.

Next, at step 520, the scaffolds 512a and 512b may be cut away, for example by a laser cutting tool, to reveal cutouts 522 in the edges of the stack. In an embodiment, the flex board 320 from FIG. 4 may include scaffolding similar to the scaffolds 512a, 512b, to aid in stacking the cell layers, and can be removed during the manufacturing of the battery. The scaffolding may be removed using laser ablation/trimming. Additionally, or alternatively, the cutting tool may be used to form the cutouts 522.

Next, at step 530, the battery stack 542 and integrated control circuitry may be assembled as follows. Spacers 544 may be placed below and above the battery stack 542. A contracting structure comprising flex-board BMS contacts 536, control ASICs 538, and contacting petals 540 may then be brought down over the top of battery stack 542 such that contacting petals 540 extend along the height of battery stack 542. Finally, insulation 534 may be applied to one more outer surfaces of the battery structure.

The flex-board contacting petals 540 may include a control board and one or more control ASICSs 538. The control ASICs 538 may control the temperature and strain of individual cells within the battery stack 542. They may also regulate the charging of the battery and/or the battery's output. Contacting petals 540 can make electrical contact with battery cells in the stack 542.

Finally, the illustrative battery 550 is produced. In one example, battery 552 may have 36 layers, a 22 mm diameter, a 9 mm thickness, and may provide a custom voltage of 100V.

Battery 552 may be tested to allow any residual gases formed from side-reactions to volatize the battery 552. The battery 552 may be placed in a vacuum, shrink wrap tubing may be applied around the perimeter. The shrink wrap tubing forms a seal and insulates the sides of the battery 552. The battery 552 is then placed in a tube and end caps made from high thermal conductive material are placed at each end. Depending on the battery chemistry, transport, and handling requirements, additional safety features such as vents can be integrated into the end caps. The assembly is then sealed with an insulating paste to isolate the access pins and hermetically seal the battery. An additional heat exchanger may also be placed around the tube depending on the heat exchange requirements.

It will now be appreciated that embodiments of the present disclosure can be fabricated using processes similar to those used to fabricate high performance consumer off the shelf (COTS) cells. The changes are primarily at the front-end with the generation of a new set of substrates, and during the back-end in the final assembly. It requires depositing the films on patterned substrates, which can be prepared at high throughput and low-cost using technologies developed in the circuit-board and metal-etch industries. The housing, active circuitry, capacitors, and heaters also utilize well established processing techniques developed in the IC and MEMS fabrication industry, and primarily required back-end changes.

Figure 6:
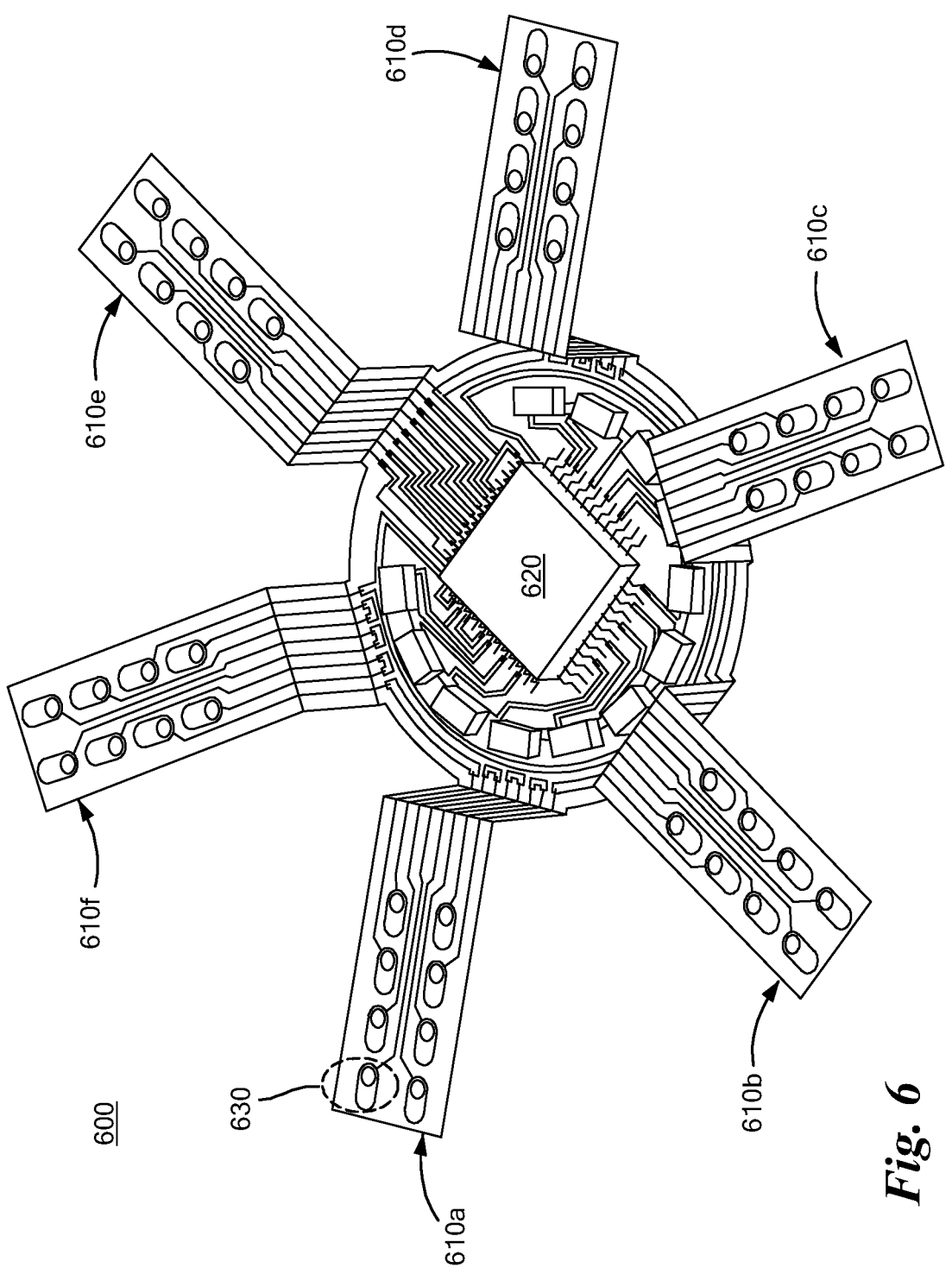
FIG. 6 is an isometric view of a contacting structure that may be used with the battery design of FIGS. 3-5, according to some embodiments.

FIG. 6 shows an example of a contacting structure 600 that may be used with the battery design of FIGS. 3-5, according to some embodiments. Contacting structure 600, which may be formed on a printed circuit board (PCB), may be similar to or the same as or similar to structure shown by the flex-board BMS contacts 536, control ASICs 538, contacting petals 540 shown in FIG. 5. The illustrative contacting structure 600 has a plurality of contacting petals 610a-f, each of which may include a series of electrical connectors (e.g., such as connectors 630). While six (6) petals 610a-f are shown in this example, other numbers may be used. Contacting structure 600 may also include electronics 620 for cell-level and/or batter-level control.

Figure 7:
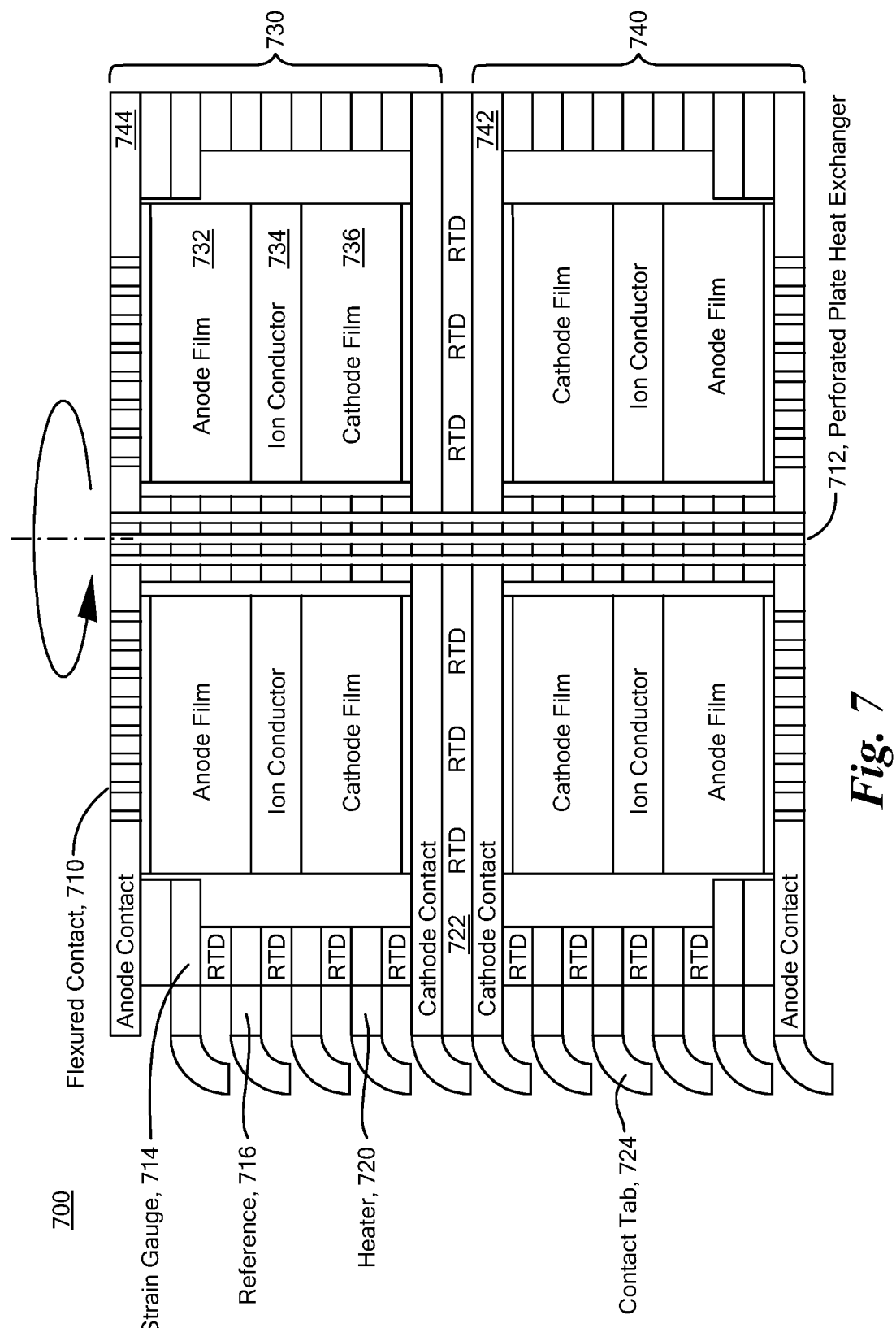
FIG. 7 is a cross sectional view two individually managed, stacked cells that may form a part of a battery, according to some embodiments.

FIG. 7 shows a battery (or layer thereof) 700 comprising two cells 730 and 740. Battery 700 further includes a flexure contact 710, a cooling channel 712, one or more heating elements 720, one or more strain gauges 714, and one or more reference strain-relief elements 716. Representative cell 730 has an anode film layer 732 and a cathode film layer 736 separated by an ion conducting separation layer 734, along with an anode contract 744 and a cathode contact 742. The two cells 730, 740 may be separated by an RTD layer, as shown, which acts as a resistance thermometer.

Although not shown, the anode contact layer of cells 730 and 740 may be electrically coupled to the anode contact layer of another cell. In this manner, cells 730 and 740 may be coupled in parallel with other cells. The flexure contact 710 and contact tab 724 may provide support for such a structure. Thus, battery 700 may provide power to a load coupled between the cathode contact layers and the anode contact layers.

In an embodiment, the cooling channel 712 may be a perforated plate heat exchanger. In an embodiment, the heat exchanger may include metal layers, through vias, and perforations for introducing electrolytes.

Figure 8:
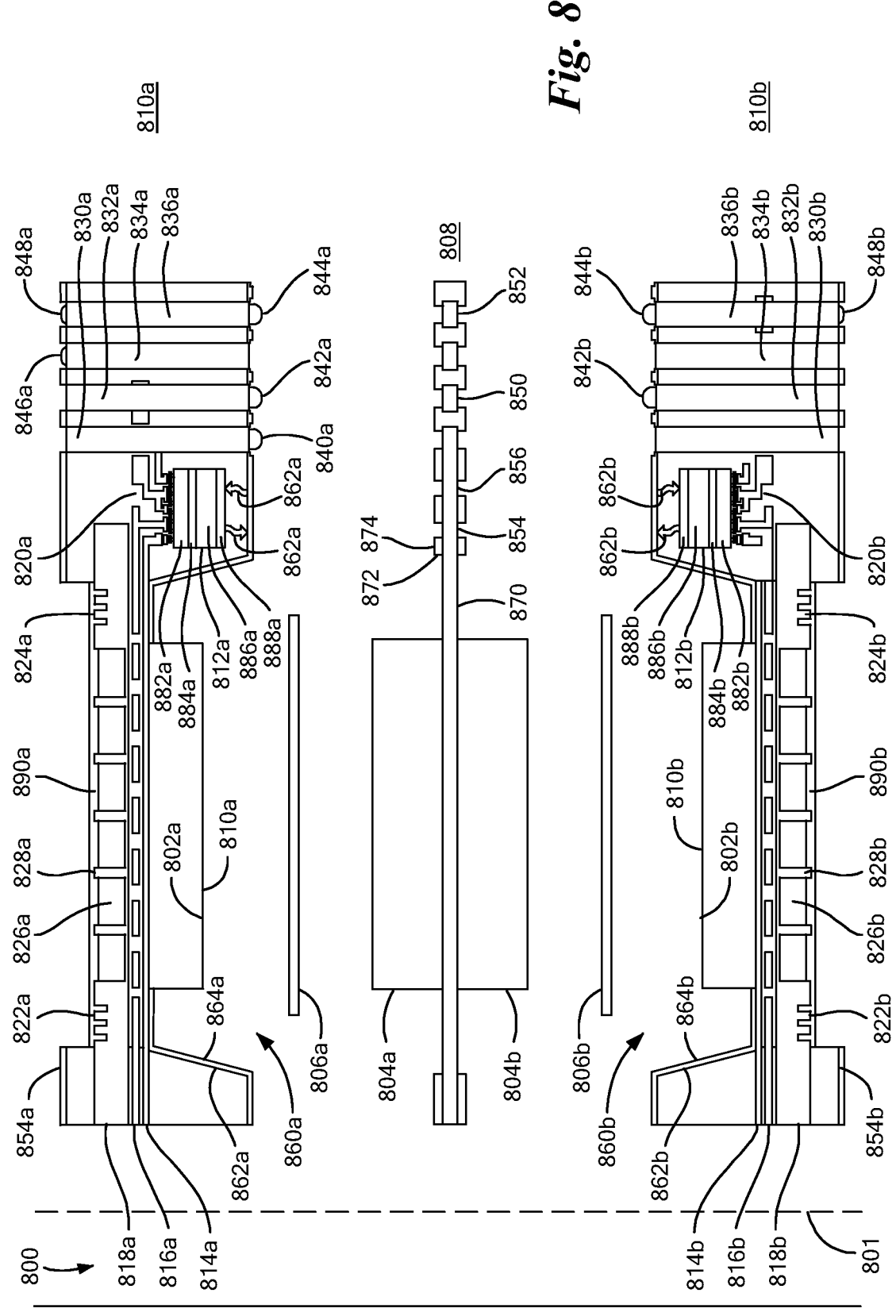
FIG. 8 is a cross sectional view showing assembly of an individually managed, stackable battery cell, according to some embodiments.

FIG. 8 shows another cell design whereby electronics are incorporated directly in each layer. Although there is no specific constraint on footprint or active material stacking arrangement, certain geometries simplify modeling and insure uniform or predictable transport, mechanical, and charge flow profiles. For simplicity, an annular geometry is described herein with the electronics and routing signals arranged around the perimeter of the device to create structures with radial symmetry. A bilayer cell structure is also employed where the anode 802a and 802b, cathode 804a and 804b, and separator 806a and 806b, are split in two parallel cells about the midplane, creating azimuthal symmetry. In the specific example, the cell has a central hole as temperature increase towards the interior of the cell. The side view is rotated radially about the axis 801.

Figure 9A:
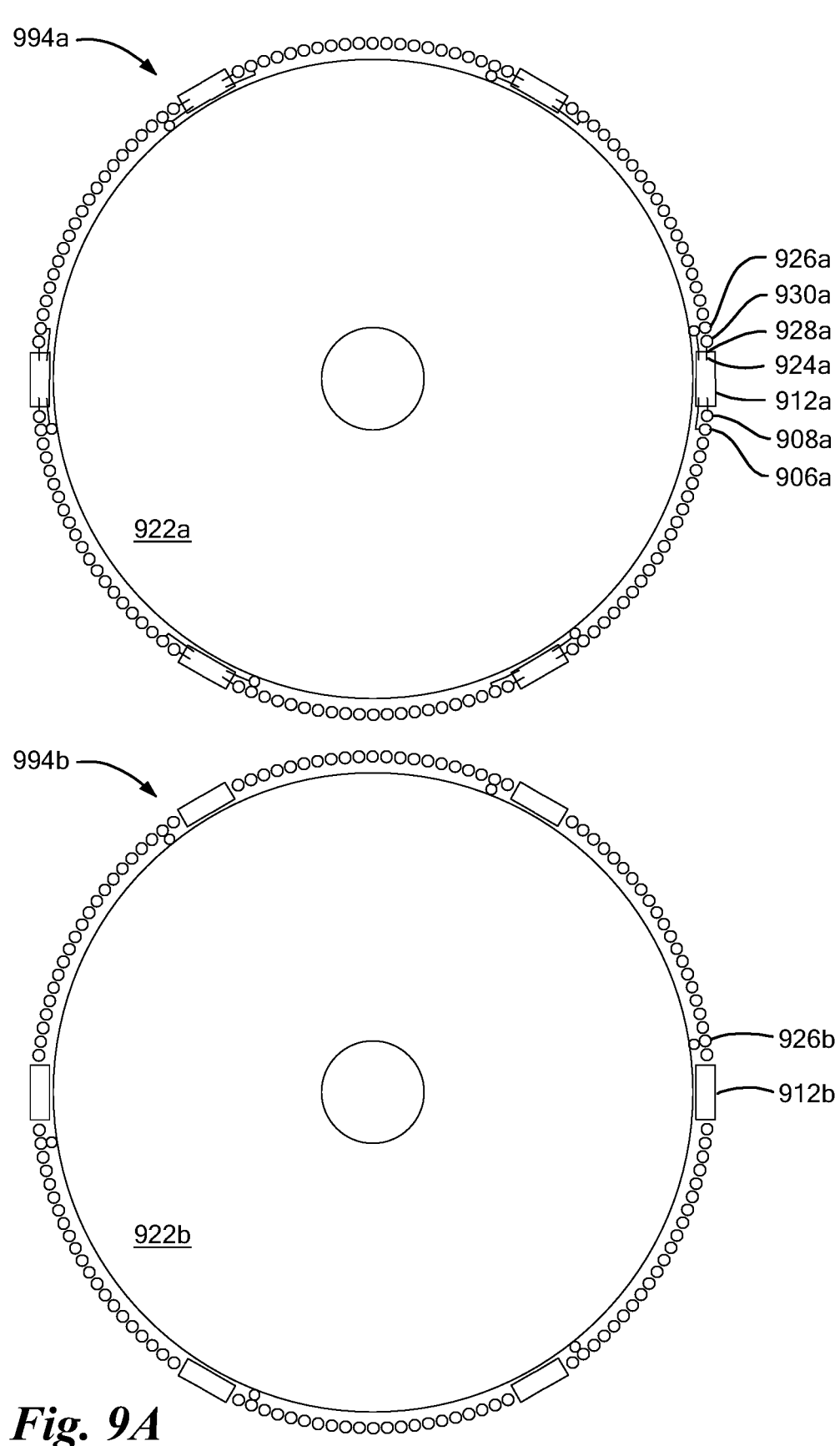
FIG. 9A is a top view of the current collector metallization layout
Figure 9B:
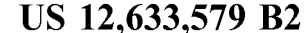
FIG. 9B is a top view of the heater metallization layout
Figure 9C:
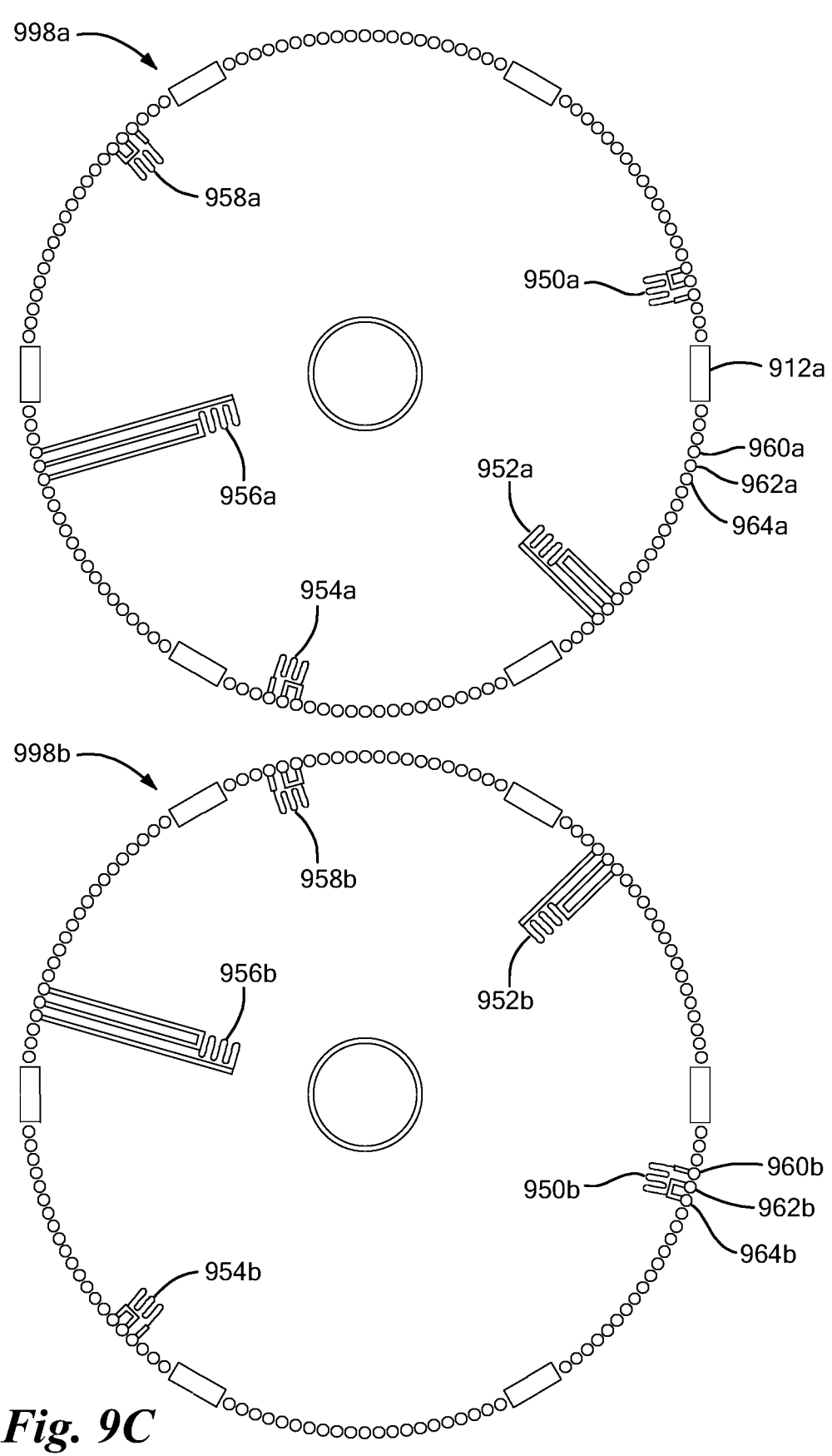
FIG. 9C is a top view of the thin-film sensor metallization layout

Referring to FIG. 8 and also to FIGS. 9A, 9B, and 9C, a cell 800 is fabricated from a set of three different layers, two functional backplanes 810a and 810b and the shared counter electrode 808 for the cathodes.

The backplane layers 810a and 810b are fabricated using wafer fan-out technology while the electronic cell management circuitry 812a and 812b for controlling and monitoring the cell is divided into two separate portions as discussed in a later stage. Wafer fan-out technology has been established to address the growing size mismatch between wafer dies, which track with transistor size and interconnect dimensions, which have remained relatively constant. Polymer wafers are created by backfilling arrays of separate discrete dies with an organic polymer. Additional metallization steps and electroplated through wafer vias are performed on the reconstructed wafer, effectively extending die area with "cheap" material. The metal traces are added through sequential photolithographic patterning of electroplated copper grown through openings in photographically patterned insulating layer. In some cases, functionality is built up in multiple metallization layers, but for simplicity the cross sectional view in FIG. 8 shows primary metallization groupings for current collection, 814a and 814b, heating and sensing, 816a and 816b, and thermal and stress management metallization group 818a and 818b. Additional metallization layers 820a and 820b redistribute power and signal lines traversing through vias 830a, 830b, 832a, 832b, 834a, 834b, 836a, and 836b as well as metallization groupings with the cell management circuitry 812a and 812b I/O pads.

Backplane 810a and 810b contain one or more current collectors 814a and 814b. As shown in the top down view 994a in FIG. 9A, the current collector in backplane 810a, spans an annular region 922a and is routed through trace 924a to the cell management circuitry 812a denoted by the dashed rectangle 912b. In this particular example, there are six separate embedded dies 812a evenly clocked about the central axis 801 to provide multiple current tap points to reduce current crowding and provide redundancy. Similarly, as shown in the top down view 994b in FIG. 9A, the current collector in backplane 810b spans an annular region 922b. The collected current is routed to the electronic cell management circuitry 812a through via 926b, via 926a, and trace 924a.

Other traces may also be patterned in the current collector metallization layer shown in FIG. 9A. Trace 928a is used to route the output power passing through the cell management circuitry 812a to additional cells through via 930a to the next layer in the stack. Similarly, via 908a connects the cell to the output of the previous layer.

The current collectors 994a and 994b may be subdivided into separate pie shaped cells, to allow individual cells on a layer to be connected in series to further build up voltage. Each CMS monitors each individual cell on a layer and communicates to the BMS through its associated data and timing bus passing through a dedicated set of vias. In this case the output from one cell in a layer is routed to the input terminal of the next adjacent cell, with the final cell in the stack passing its output to the next layer in the stack. The partitioning reduces the amount of active material, but enables a higher voltage per unit volume versus unit capacity.

Metal layer group 816a and 816b are used for sensing and heating. FIG. 9B shows a top view of the heater metallization 996a in backplane 810a and 996b in backplane 810b. The heater positive and negative terminals 932a and 934a span through traces 936a, 935a, and 938a respectively. The traces also intersect with vias 940a and 942a which connect through to vias 940b and 942b in backplane 810b heater metallization 996b.

FIG. 9C shows a top view of the metallization 998a for two three terminal thin-film resistive temperature sensors 952a and 956a and three strain temperature sensors 950a, 954a, and 958a in backplane 810a. FIG. 9C also shows the top view of the metallization 998b for two three terminal thin-film resistive temperature sensors 952b and 956b and three strain temperature sensors 950b, 954b, and 958b in backplane 810b. As the transduction circuitry is in cell management circuitry 812a in backplane 810a, any sensing signals in backplane 810b pass through vias to backplane 810a. For instance, the signal lines for strain sensor 950b pass through vias 960b to 960a, 962b to 962a, and 964b to 964a. To conserve lateral area to maximize the amount of active material, the multiple traces connecting the signal lines to the cell management circuitry occur on separate metallization layers, also connected to vias 960a, 962a, and 964a. Two sets of sensors are tied to each cell management circuitry 912a in backplane 810a. The stress sensors are placed over portions where deflections are the greatest, and transduce resistance changes as the trace length is altered. This signal level may be used to track the state of charge of the cell as well as monitor long term degradation of the device from elastofracture mechanisms. The information is relayed to the battery management system which reconstructs a spatial mapping of the temperature and strain through the system to monitor the state-of-health of the system. The heaters can be individually driven or tied together.

Metallization group 818a and 818b are used for stress and thermal management. Lithium ion batteries undergo volume changes during charge cycling. To minimize stresses on all contacts, compliant structures are used between the region containing the active material, and active circuitry and contacts. A caged architecture is employed using corrugated portions 822a, 822b, 824a, and 824b to also maintain anode 802, cathode 804, spacer 806 and current collectors 814 in intimate contact.

A simple first order analysis can be used to calculate the nominal thicknesses required for typical use cases. For instance, lithium-ion pouch cells are typically loaded externally under a compressive pressure between 4-40 psi, to ensure stacks of active layers to not shift during repeated cycling. The number, scale, and equilibrium set point of the corrugations necessary to impart a similar scale pressure over the annular region supporting the active materials can be estimated from the ribbed section's effective spring constant. To first order, the spring constant scales as the ¼×Number of Corrugations×Young's Modulus×flexure width×the ratio of the flexure thickness to span cubed. The flexure width is nominally the circumference of the rib, flexure thickness is the metal thickness remaining in both metal layers after patterning, and flexure span is measured in the radial direction. For instance, for copper with Young's Modulus of 130 GPa, 3, 10 micrometer thick ribs spanning one hundred micro meters over a 2×Pi×4 mm width has a spring constant of nominally 2.5 N/micro meter. By adjusting the combination of span and thickness, or number on the outer radii, to have a comparable value, the spring total spring constant is nominally 5 N/micro meter or 1 pound/micrometer. By having the counter electrode layer displaced over an initial set point of nominally 20 micrometers, a 20 psi compressive force is produced over the annular region nominally 1 square inch. Typical anode and cathode materials used in lithium-ion cells swell by nominally a few percent. For a 200 micro meter thick layer, this results in an additional ~6 micrometer displacement. The corresponding variation in pressure is within the typical range (4-40 psi) current in use to constrain active material in pouch cells.

To minimize temperature excursions, the metallization group 818a and 818b is patterned with wells to retain phase change material 826a and 826b. The lattice structure 828a and 828b defining the wells distributes heat as well as stiffens the current collectors 814a and 814b. The metallization group 818a and 818b also conducts heat laterally to the perimeter and center through hole.

Referring to FIG. 8, the thickness of the phase change material 826a is a partial fraction of the active material thickness, but the amount may be of comparable scale or greater depending on tradeoffs between lifetime and maximum temperature excursion under intense high discharge pulses. Assuming the electrochemical cell is discharged at an extremely high 20 C rate for 30 sec, the electrical power density of advanced lithium-ion batteries is nominally 2 kW/L (250 Whr/L×20/hr=5 kW/L) with nominally an equal amount energy released as heat. The nominal heat capacity for a battery is 2 kJ/L/K, resulting in a 2 kW/L/2 kJ/L/K×30 sec or 30 K temperature rise, already approaching the margins of safe operation for a lithium-ion battery operated at room temperature, even without accounting for the higher temperature rise in the interior of the battery. As the latent heat of fusion for representative materials is nominally 100 kJ/L, adding approximately one-half the amount of phase change material largely offsets the temperature rise, as the thermal generation rate 2 kW/L times pulse time are nominally equal.

Backplanes 810a and 810b contain multiple vertical data and power traces which are configured to transfer signals between cells in the stack or within a specific layer. Via 830a connects to the counter electrode 808 through solder bump 840a, routing the power line to the cell management circuitry 812a through via 906a. Via 832a and 832b routes signal and power lines between backplanes, with isolated pad 850 patterned on 808 bridging solder bumps 842a and 842b. Vias 940a, 940b, 942a, 942b fall within this category. Via 834a routes the output power on one layer to the negative terminal on the next cell layer or battery management layer if the final cell in a stack. Vias 836a and 836b are configured to pass control data between the cell management circuitry and battery management system through the entire span the entire length of the stack. Solder bumps 844a, 844b, 848a, and 848b are added, with isolated pad 852 on 808 bridging the path. Capping layer 854a and 854b prevent solder spreading between contacts.

Vias may also be used to interconnect the cell management circuitry 812a and 812b on each backplane if the control circuitry which interfaces with the battery management system operates within the same voltage window as the cell. However, if large transients occur on the load, or the cells are configured in series to build up a large output voltage, the control and load side switching and monitoring circuitry must be galvanically isolated. As shown in FIG. 8, the cell management circuitry on the load side cell management circuitry 812a exchanges status information optically using coupled pairs of LED and photodiodes. Through holes 854 and 856 are patterned in the cathode current collector 870 to allow light 862a, 862b to pass through. The polybenzoxazole polymer material, thin-film barrier and encapsulation layer is sufficiently transparent at common LED emission wavelengths that separate windows do not have to be patterned in backplanes 810a and 810b.

Each backplane 810a and 810b also contain a recessed area 860a and 860b for the active materials. The organic polymer is removed using reactive ion etching, laser ablation, or a combination of the two, terminating on the current collector 814a and 814b. The current collector 814a and 814b may subsequently be coated with an additional metal using evaporation or sputter coating through a sequence of shadow masks to improve interfacial properties. It may be etched to reduce system weight or textured to create a bulk contact. For cells employing a liquid electrolyte, an additional titanium nitride thin-film barrier film 862a and 862b can also be deposited along the side-walls and bottom of the device to prevent lithium ion migration into the active circuitry. An additional insulating silicon dioxide encapsulation layer 864a and 864b is also deposited since titanium nitride is conductive.

The counter electrode layer 808 can be fabricated in a similar fashion as performed to define the metallization layers on 810a and 810b. As the thickness will be nominally 1 mil or less, to simplify handling, the tier can be fabricated using etch back techniques around a thicker frame area removed at a later stage via laser trimming. The electrode may be plated with an additional metal to improve interfacial characteristics. To minimize weight, it may also be perforated allowing active cathode material to fill voids as the cathode material includes electrically conductive additives. Insulating layer 872 isolates pads 850 and 852 and prevents solder from spreading between contacts during joining. An additional silicon dioxide porous layer 978 can also be deposited to allow gas generated during cell forming to escape. Additionally, slits may otherwise be patterned to allow gas to escape, and sealed off as described later to prevent electrolyte loss in the long term.

For both backplanes 810a, 810b and counter electrode 808, conductors are chosen that are chemically compatible with the active materials. For example, copper current collectors may be used to contact lithiated metal oxide cathode materials, while aluminum current collectors may be used to contact graphitic carbon anode materials in lithium-ion batteries. The conductors may also be a noble metal, such as platinum or palladium, which do not readily oxidize. The metal traces are typically between 100 nm-5 micrometers thick and are tailored to the conductivity requirements of the power and signal lines, piezo- and thermos-resistivity requirements of the sensors, and impedance of the heaters. The metal width and thickness for the power lines are defined by the tolerable Ohmic drops. For a 200 micrometer trace 1 micrometer thick, we anticipate maximum current levels in a layer 30 mm in diameter at a very high discharge rate of 30 C is 1 A resulting in a resistance loss of only mOhm/cm path length.

The insulating layers are nominally 500 nm-1 micrometer thick, but can be thicker to increase stand-off voltages if a high voltage battery is being constructed, as bus and power routing lines are operating over different voltage windows. The via diameters are also defined by the conductivity requirements for power and signal lines. For through plated copper vias, diameters will typically only be on the order of a few hundred micrometers even with high discharge rates.

As one example, the underlying analog switching, transduction and conversion circuitry to monitor cell voltage, current, and impedance and control cell charging contained in one cell management circuitry 812a in backplane 810a, while the cell management circuitry 812b for polling the signals and interfacing with the BMS is in a second chip on the second backplane 810b. Data is transferred between the two systems using free space optocouplers providing galvanic isolation between the load and controller side portions of the system. In this manner, the controller and cell can operate within different voltage windows. Data can be transferred as analog levels, but optical devices are sensitive to thermal variations. In practice, data is transferred digitally, first converting data into a digital format using analog to digital converters with built in temperature compensation. In the most robust design, power is also transferred optically from the controller side cell management circuitry 812b to the load side cell management circuitry 812a. While power can be pulled from the cell, the circuitry is exposed to transients on the load.

Other isolation technology may also be employed. Capacitive or inductive based isolators may also be used which can be fabricated in CMOS compatible technology, but have more restrictive demands on the gap spacing. Using a combinations of wafer bonding and etch back techniques, devices from different semiconducting material families can be combined into a single stacked die. Through wafer vias are patterned to connect the individual tiers. Here, both the analog and digital circuitry can be fabricated using CMOS compatible processing initially on an SOI wafer comprising tiers 882a (active silicon), 884a (oxide), and 886a (silicon handle) in 812a and 882b, 884b, and 886b in 812b. While the load side may be operating at a different ground reference, the voltage window is still limited to the range of the cell voltage.

The handle wafer portion 886a and 886b contains an array of deep trench capacitors fabricated using silicon technology. The capacitors are inherently three dimensional in nature to achieve high capacitive arial densities. These can potentially be fabricated directly in the handle wafer on the SOI wafer rather than using a separate bonding step. Finally, light emitting photodiodes and photodiodes are in the final tier 888a and 888b applied to the SOI wafers using heterogeneous integration. The photodiode and LED can be added as separate tiers, or fabricated homoepitaxially on the same substrate, using a combination of etch back techniques to expose each component's set of active materials. LED's typically are fabricated using a double heterostructure combining while photodiodes use a single homostructure.

Other options are possible. Phototransistors may also be employed, as the detector but provide additional process complexity and generally lower radiation tolerances. All sources can be on one wafer and reflective modulators used to allow at least one device to be integrated solely in a silicon platform. Capacitive and inductive isolator technologies have also been developed for CMOS, but have more demanding requirements on gap spacing. In addition, LED and PD can be configured in optical transformer combinations to directly generate different bias levels for the analog circuitry. For instance, a single LED can illuminate multiple PD's hooked up in series to build up a higher output voltage.

A simple order of magnitude estimate can be made on the footprint and thickness of each portion of the CMS. A 16-bit digital processors based on the Texas Instruments MSP430 microcontroller at the 90 nm node in FDSOI occupies less than 1 mm squared, and consume nominally 10 pJ per instruction cycle, which is approximately 13-14 orders of magnitude lower than the energy capacity of the layer. Although analog circuitry has not undergone the same size and power scaling, representative area, and power numbers in the literature for an analog to digital converter at the 22-nm node are 0.14 mm2 and 100 pJ per sample. A single operational amplifier to precondition analog signals adds approximately 10% additional area and power overhead. The power requirements of advanced microelectronics are a small fraction of the power capabilities of cell it is managing for the targeted 10-30 mm diameter cells.

The additional MOSFET based analog switches for routing power through or around the cell may be used to add series resistance. Maximum current levels are dependent on the chemistry employed and application requirements, but as upper bound, the area requirements of the MOSFET can be estimated by ensuring the ratio of the Joule heating loss to power delivered, or equivalently, the voltage drop is a small fraction of the output voltage. As a representative value, advanced lithium-ion cells capable of outputting at 30 C deliver 360 mA for the present embodiment, where the area of the annular region is approximately 4 cm2. A 10 mOhm resistance results in a 0.3% loss. FDSOI MOSFETs with nominally 10 V breakdown have nominal channel resistances on the order of 10 mOhm per mm2 or less. To further reduce series resistance losses and improve breakdown voltage limits, a separate tier containing higher bandgap semiconductors such as Gallium Nitride (GaN) or Silicon Carbide (SiC) can be used for the analog switches.

The capacitive tier is inherently three dimensional to build up surface area. Based on commercial devices such as the MURATA MGSC series capacitors used in medical implants, deep trench capacitor arrays achieve nominally 35 nF/mm2 over a 50 micrometer thickness. This is sufficient to power at least one hundred instruction cycles, assuming the capacitor discharges from 1 V to 0.9 V for a controlled power down.

Monolithic LED/PD pairs, fabricated arrays in Aluminum Gallium Arsenide (AlGaAs) are used as the isolators, with a 5 by 5 array on 200 micrometer pitch provide a sufficient number of isolators with series connected level shifting to drive analog switches. MicroLED's used for heads up displays are only on the area of 20 micrometer in diameter and consume microWatts of power. PD's will be inherently larger to collect off axis radiation, but given the very short path lengths (50 micrometers or less) add only an insignificant size increase for the majority of incoherent light emitted. Even accounting for very low external quantum efficiencies of 10%.

Thin film resistors can be also deposited in the metallization layers as is already done. To produce resistors with low CTE, NiCr is commonly used or combinations of TiN and TaW to allow different materials within a required processing thermal budget Taken collectively, die sizes on the order of 1-3 mm2 should be sufficient in the present application. A die thickness between 70-100 micrometers should also be sufficient as the total thickness of the active cathode, anode, and spacer material is typically on the order of 200-250 micrometers.

In some embodiments, the layer of each active material may be 50-100 micrometers thick and may be made up of standard cathode or anode materials used in commercial lithium-ion batteries. Although the approach is chemistry agnostic and extendable to different form-functions, a cylindrical form function with 25 mm outside diameter may be used. Thinner layers of active materials may also be used, although more aggressive thinning technologies may be necessary to ensure the support structures and thin films are a small fraction of the active material thicknesses.

To assemble a layer, ambient conditions are controlled based on the reactivity of the active materials and electrolyte. The active anode and cathode materials can be deposited using inkjet technology using for example equipment and process conditions as reported from Sztymela et al. (Heliyon, v. 8 e12623, 2022). Material may also be applied using doctor blade techniques with a stencil mask for counter electrode 808. The active materials may also be reversed with anode material deposited on 808 and cathode material in backplanes 810a and 810b if for instance a material is more amenable to one particular coating technique. For liquid based cells, electrolyte is added to the spacer and active materials.

In lithium-ion cells, polyethylene may be used as a spacer material, and infused with a liquid electrolyte. The spacer can be defined using a die cutter or laser and placed using a guide or precision pick and place tool. Newer classes of solid-state electrolytes may also be employed. In such embodiments, the spacer can be embedded in a ribbed gasket, providing a degree of compliance to minimize stresses as glass or ceramic based materials are being increasingly considered to replace polymer-based membranes to improve safety.

Solder 840a, 842a, 844a, 846a, 848a, 842b, 844b, and 848b can be deposited as paste or though sputtering techniques depending on size. A localized heating source is used to minimize thermal degradation of the active materials and electrolyte during solder joining.

Phase change material 826a and 826b may be heated, and dispensed in the liquid state, and finally encapsulated with a thin overcoat of elastomer 890. An adhesion promotor is typically used prior to coating to prevent the elastomer from delaminating, as the phase change material also undergoes volumetric changes during melting and solidification. To augment attachment, the elastomer portion extends beyond the trussed area to the ribbed section, where the deflection of the diaphragm naturally pinches the material. Alternatively, no elastomer may be used if microencapsulated phase change material is employed.

After assembly the cell 800 may be charged, typically under conditions different than during common usage in a process commonly referred to as forming, to produce robust interface layers. Each individual cell can also be prescreened through multiple charge cycles before being added to the accumulating stack.

Figure 10:
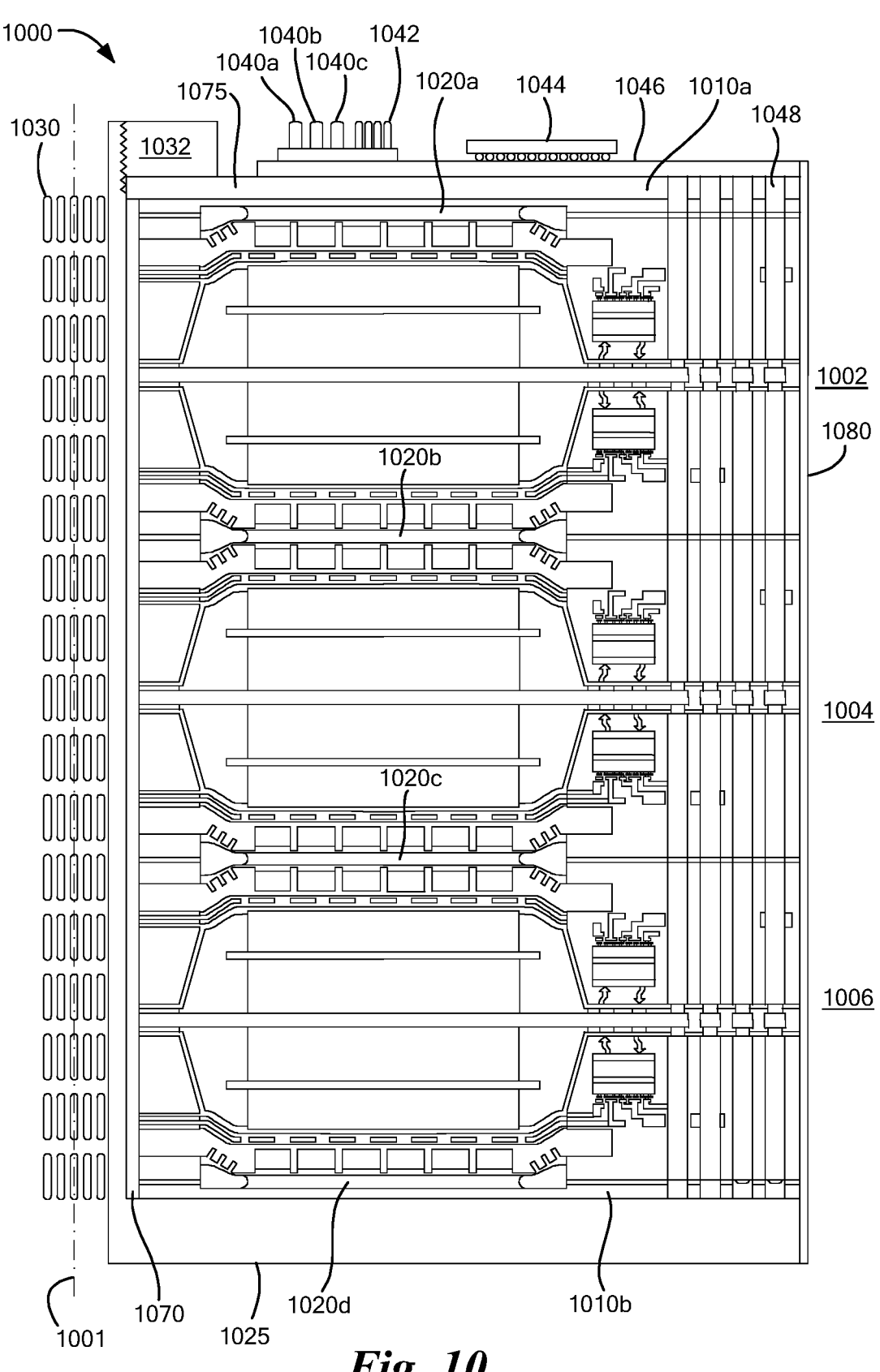
FIG. 10 is a schematic diagram of a battery having different types of cells, according to some embodiments.

Once a cell is tested and validated, it can be added to an accumulating stack using solder joining. Daughter vias may also be used to avoid remelting solder previously treated. FIG. 10 shows a stack of cells incorporated into a circular housing with an integrated battery management system rotated about axis 1001. A thermally conductive, electrically isolating ceramic liner 1070 is placed around housing base 1025. Cells 1002, 1004, and 1006 are shown with their associated backplanes deflected. Retaining nut 1032 applied against backing plate 1075 provides a compressive force on the stack, minimizing stresses on the solder joints. During stacking, polydimethylsiloxane or spacers 1010a and 1010b in gap 1020a, 1020b, 1020c, and 1020d and allowed to harden in place to provide dampening between cells in high shock environments. The battery management system 1044 interfaces to the cell stack through circuit board 1046 at the via positions 1048 in the last cell in the stack. The BMS manages the control of each cell management system by exchanging control information through a digital data bus which spans the length of the cell stack. By also transferring the battery negative terminal through the stack, the battery management system can measure output voltage, and shunt transients and overcharging conditions directly to ground. Multiple output terminals may be included to reduce currents on individual output pins, and both separate charge 1040a and discharge 1040c ports may be included along with a ground tap 1040b. Digital control and status information is introduced at connector 1042. The housing is sealed using shrink wrap tubing 1080 around the outer perimeter. A perforated plate heat exchanger 1030 can also be introduced to improve heat extraction.

In reference to FIG. 10, the thermal range and lifecycle requirements can also be tailored by combining cells with different optimized properties. As depicted in FIG. 10, cells with varying properties can be used to produce the desired battery 1000. Batteries directly combine storage and conversion, placing special constraints on the degree capacity, discharge rate, temperature window, lifetime and safety can be independently optimized. Cells with thicker layers of active material have higher capacity at the extent of discharge rate and temperature window which is instead driven primarily by the total surface area of the separator. Larger areas effectively reduce ion conduction losses from the lower current flux. Additionally, cells can sacrifice a degree of cycle life while increasing capacity by overcharging the battery. For example, in an embodiment, to reduce the level of storage, the (1) desired battery 1000 may contain cells with high capacity cells and low discharge cells, but a low number of recharge cycles. These cells can effectively be held in reserve for the few occasions where extended periods of limited ambient energy are available.

In another embodiment, (2) desired battery 1000 includes cells with low capacity, and high discharge, and high recharge cycles for periods of high peak power such as during data compression or transmission bursts, and cells with high capacity and low discharge rates to power baseline loads. In another embodiment, (3) desired battery 1000 includes high capacity cells, low discharge cells, and high recharge cycles for periods of low power such as during periodic data logging or receiver checks. In another embodiment, (4) desired battery 1000 includes cells with different temperature ranges to extend the operating conditions of the device over seasonal variations.

The cells themselves may be connected in different series or parallel combinations to achieve a specific voltage and current requirement without needing additional packaging. There are a number of different ways to create the desired battery structure, for instance by switching out cells.

In an embodiment, cells can be switched in out in series connected strings to provide a more quasi-regulated voltage output at constant current draws to account for the inherent power drop that occurs as a battery is discharged. Alternatively, cells may be added or switched out to boost current output in parallel connected cells to offset the drop in output power. Additional cells may also be included, rather than providing redundancy at the battery level. A poling technique combined with additional bypass features is also integrated, allowing a fault condition from a short through an individual cell's spacer layer. The ability to isolate faults provides a means to prevent the whole battery from discharging and helps to contain damage to prevent spreading.

Some fault tolerant power systems rely on battery storage to allow a controlled transition in the advent of an interruption in one source. The proposed architecture adds fault tolerance at the cell level, by incorporating active isolation circuitry, as well as additional passive diodes if necessary. In this manner, an entire battery does not have to be removed in the advent of single point failure in one cell. The ability to dynamically cycle cells in and out of the string during discharge provides a means a more constant output voltage to minimize the losses when using a simple drop-out regulator in applications requiring constant input voltages.

Figure 11:
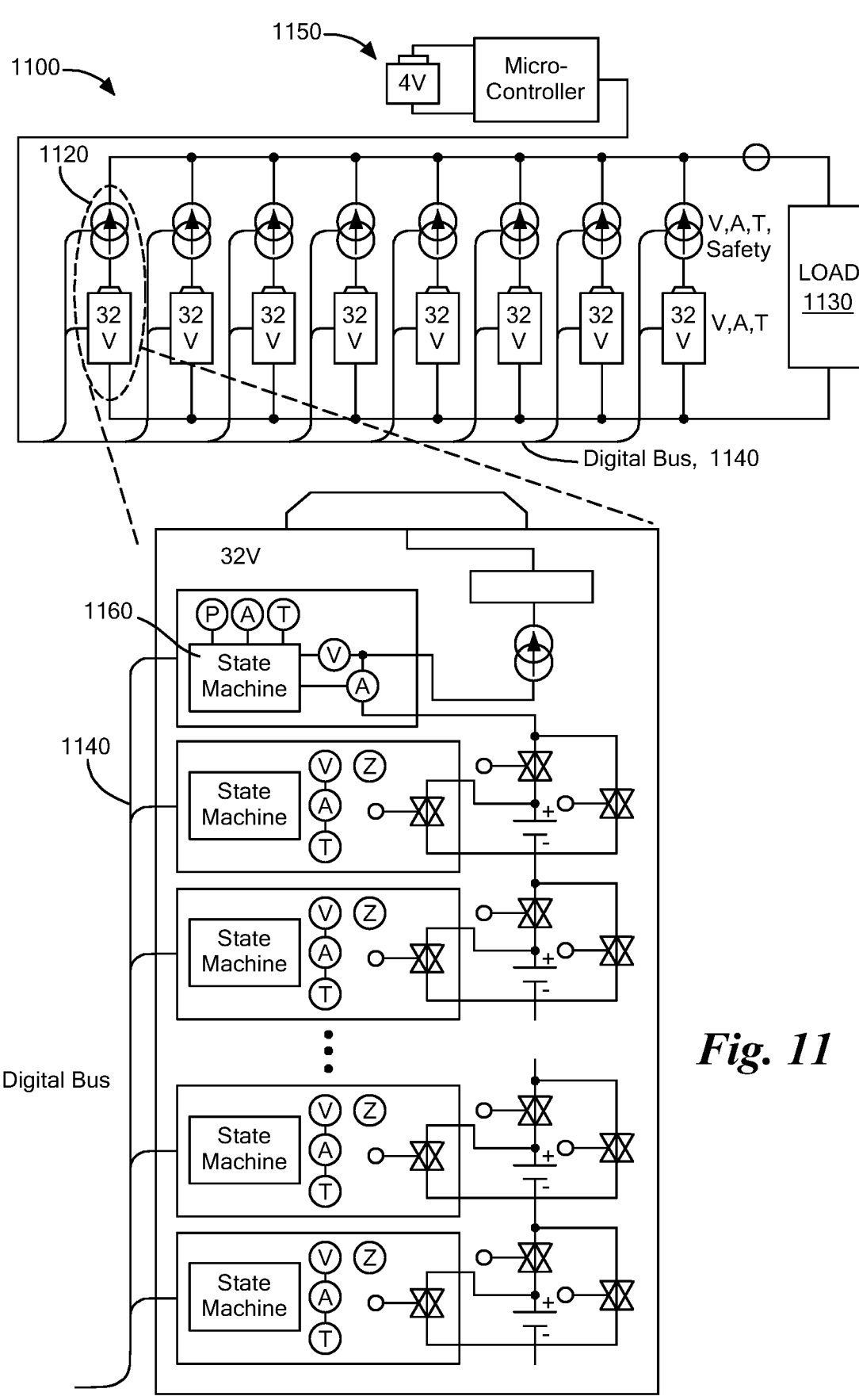
FIG. 11 shows an example of an array comprising a plurality of high-voltage batteries arranged in parallel, according to some embodiments.

As depicted in FIG. 11, the disclosed batteries may be utilized in a battery system 1100. In an embodiment, a battery 1102 provides power to a load 1130. The battery 1102 is connected to the other batteries through a digital bus 1140, which connects to a state machine 1160. The digital bus 1140 is connected to a microcontroller 1150, which works to control the battery 1120 or batteries. The battery system 1100 may include a single battery or multiple batteries, the battery 1120 may be similar to the batteries previously discussed. The battery system 1100 contains control circuitry both at the electrochemical cell and battery level, which will be discussed more below.

The BMS supervises the operation of the cells, controlling which cells are switched into the power path under instructions from the pack management system or control circuit. The BMS contains many of the circuit functions normally associated with pack level control circuits supervising the functions of multiple batteries. In this manner, a quasi-regulated voltage output can be produced.

The BMS monitors the current, voltages, and temperatures, and compares them against its own measurements to localize faults in the cell management circuitry. It compiles predictive data based on the cells' impedance and stress measurements. Data is transferred between the cell management system and pack management system in digital format, both to allow individual batteries and cells to operate within their own voltage windows and ensure damage from voltage spikes or current surges is contained in a predictable manner. In an embodiment, the BMS contains circuit blocks to: disengage output power; continuously protect the cells from overvoltage or overcurrent conditions, as well as regulate input currents during charging; independently measure current, output voltage, temperature and stress; exchange control and status information with the cells and a host or pack management system; protect the circuitry from voltage and current transients; and regulate and store power.

Figure 12:
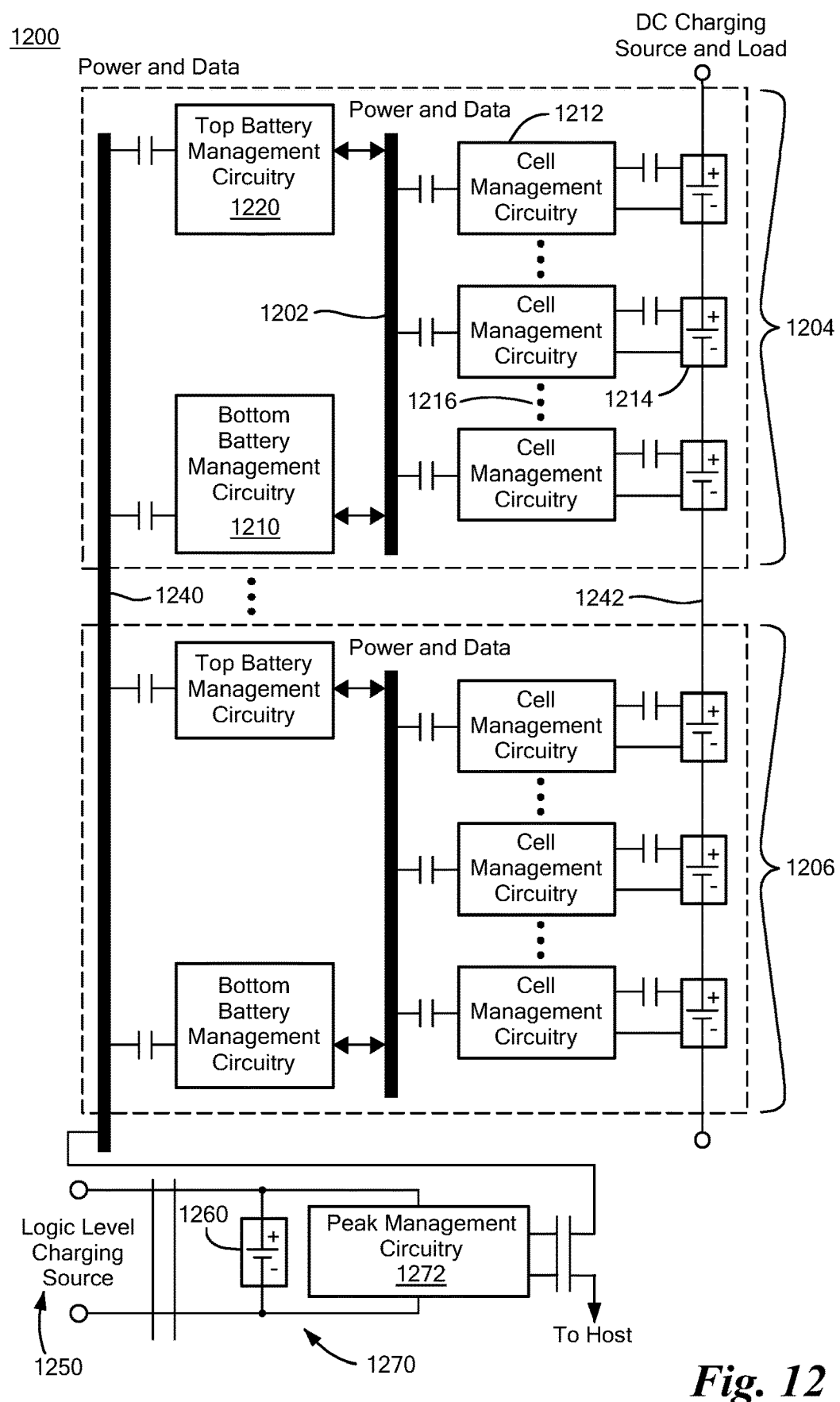
FIG. 12 is a schematic diagram of series-connected batteries, according to some embodiments.

A schematic drawing of the circuit architecture of the battery management system (BMS) is shown in FIG. 12. The battery management system 1200 may comprise two separate layers, a top layer 1204 and a bottom layer 1206, wherein the control signals are passed between each layer along an external bus 1240. The battery is controlled from a pack management unit 1270, which is connected to the layers through an external bus 1240.

The BMS supervises the operation of the cells, controlling which cells are switched into the power path under instructions from the pack management system or control circuit. The BMS contains many of the circuit functions normally associated with pack level control circuits supervising the functions of multiple batteries. In this manner, a quasi-regulated voltage output can be produced.

In an embodiment, the battery system management 1200 may incorporate multiple layers 1204, 1206 in communication with each other through an internal bus 1202. The bottom layer 1210 incorporates the primary circuitry and contains female pins to interface to other batteries or the cell management systems 1212.

The battery or batteries are controlled from a pack management unit 1270. The pack management unit 1270 communicates with the external bus 1240 of the battery management system 1200 over an isolated bus. It exchanges control and status information and provides a charging source 1250 and has a standard battery 1260 (standard batteries are well suited to low discharge applications such as driving low power electronics) for control and a dedicated pack management unit circuitry 1272. The pack management unit 1270 is sized to be able to power the electronics for the battery management systems and a small portion of the electrochemical cell management systems.

The internal bus 1202 passes status and control signals between the battery management system and cell management systems 1212 and connects the cell management systems 1212 to the power path. Further, additional power, control, and status lines run continuously through the device through the internal bus 1202 and the external bus 1240 to allow a pack management or host control circuit to exchange information with each layer.

For series connected cells, the battery management system connects to internal bus, that can be isolated, producing a floating bus. An additional conductive tube, separated by insulation can be used as a shield. Pins can be used for bus lines which run continuously through the device, to limit contact resistances at all the solder joints.

The BMS communicates with the pack management system or control circuit over a separate external bus 1240. The BMS may also contain sufficient storage to allow a controlled shutdown of all cells under its supervision, but is powered from a fully isolated power source. The power source may be internal or external to the battery.

In addition to the circuitry depicted, the BMS may also contain additional sensors to monitor shock and internal pressure, as well as to provide a condensed record of the conditions the battery has been exposed to. In addition, it may contain internal memory with binned data for the extreme conditions the battery has been exposed to for second life applications. It may also contain security codes to ensure it is not a counterfeit or has exchanging information with a trusted source. Due to the proliferation of miniaturized sensors built using silicon integrated circuit technology, high density non-volatile solid-state memory, and continued size and power scaling, particularly in the digital domain, the above functionalities can be incorporated at the battery level.

Figure 13:
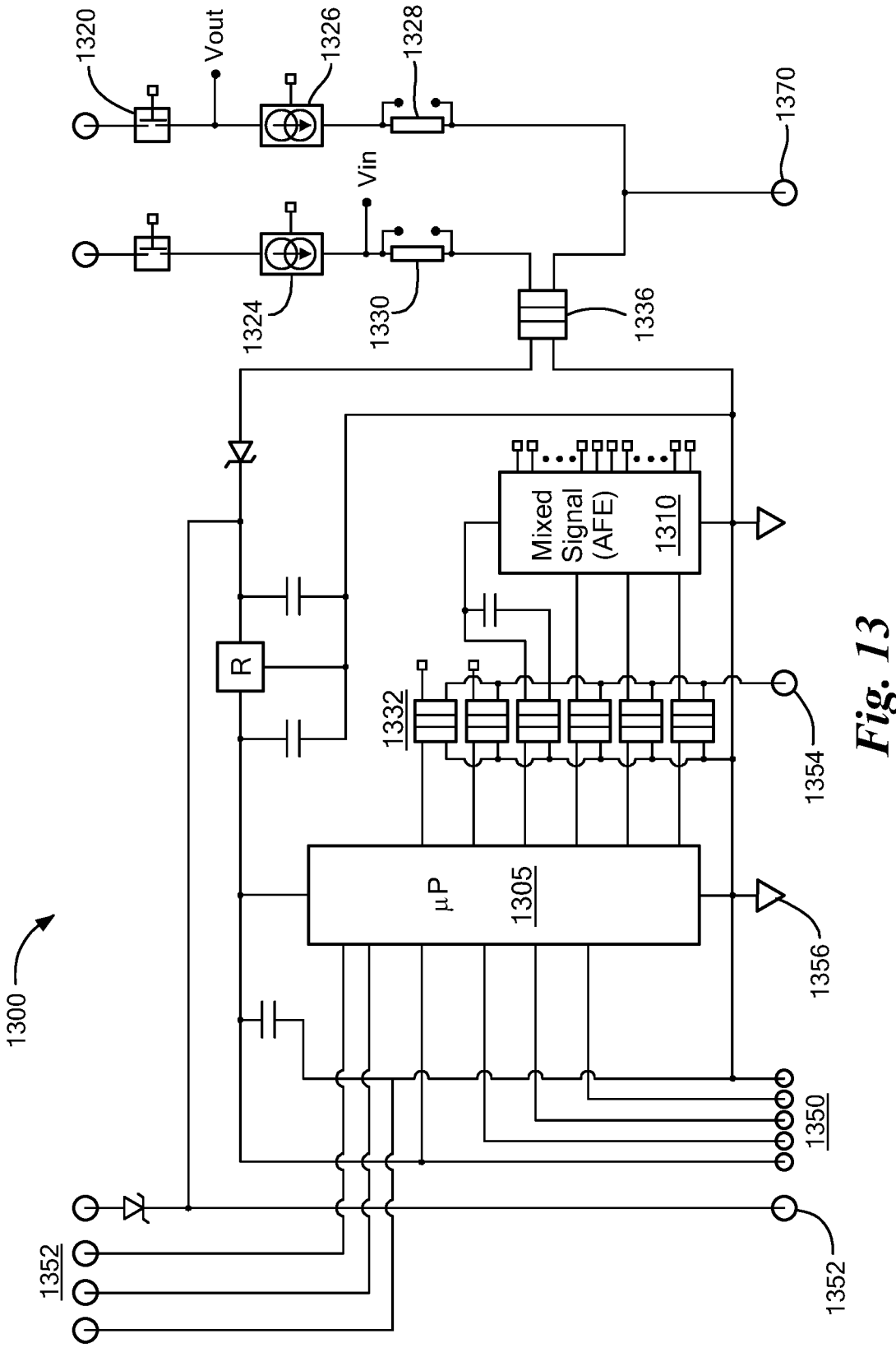
FIG. 13 is a circuit diagram of a battery management system for supervising per-cell management circuitry, according to some embodiments.

Since a vast host of chip sets currently available to draw upon, here we describe additional features which benefit the disclosed technology. For batteries at the same working potential as the battery management system controller, power can be provided by the cells for both the control and load side. For increased robustness or in instances when the battery is configured to produce high voltages a separate isolated power source is needed for the control side. For the highest reliability and ease of use, an isolated DC to DC converter can be included to draw power directly from the charging rail. FIG. 13 shows a circuit topology for drawing off power and charging a separate bank of core cells within the housing.

The various circuit elements include, but are not limited to: an internal bus 1350 routed to the core-cells in the battery; an isolator and optical transformer bank; an isolated DC to DC converter 1336 which may also be constructed from an optical transformer; current sense resistors 1328 and 1330; current regulators 1324 and 1326; a cell positive terminal 1370 entering from the main bank of core cells; a cell positive terminal connected to an auxiliary bank of parallel connected core-cells used to provide power to the BMS; external communication bus 1352; battery management system ground 1356 which is tied to the external ground in the communication port; and battery ground 1354.

Further, the circuitry may include a digital microcontroller 1305 which exchanges control and status information with the core cell on board controller through the internal bus 1350 and to an external host through communication lines 1352. The internal bus 1350 can include signal and power lines but not limited to: external heater; power feeder; data bus, or separate receive (RX) and transmit (TX) lines; clock (CLK); reset signal, and grounding line. The digital microcontroller 1305 also interfaces with a mixed signal microcontroller with analog front end (AFE) 1320 circuitry which may include one or more analog to digital converters, digital to analog converters, buffers, and amplifiers, and temperature compensation circuitry.

In the most robust implementation, the microcontroller 1305 is galvanically isolated from the signals on the load side to protect against transients, even if the all electrical components in the entire power system can share a common ground. Also, the AFE 1310 can be powered directly off the battery, but exposes the underlying circuitry to load transients. In the most robust implementation, the power is coupled optically from the control side using an optical transformer. Power can also be coupled inductively or electrostatically with appropriate modulation and rectification circuitry.

For charging, switch 1332 is enabled, and the current control regulator 1324 used to control charging currents through measurements in sense resistor 1330. During charging, power extracted from isolated DC to DC converter 1336 provides power to the BMS and also recharges an auxiliary bank of core-cell batteries. The core-cell batteries power the BMS and core-cells when an external source of power on the external communication line 1352 is not available.

To discharge, AFE 1320 is enabled. Current regulator 1326 in combination with voltage measurements and current measurements through sense resistor 1328 can be used to control discharge voltage level or current.

Figure 14:
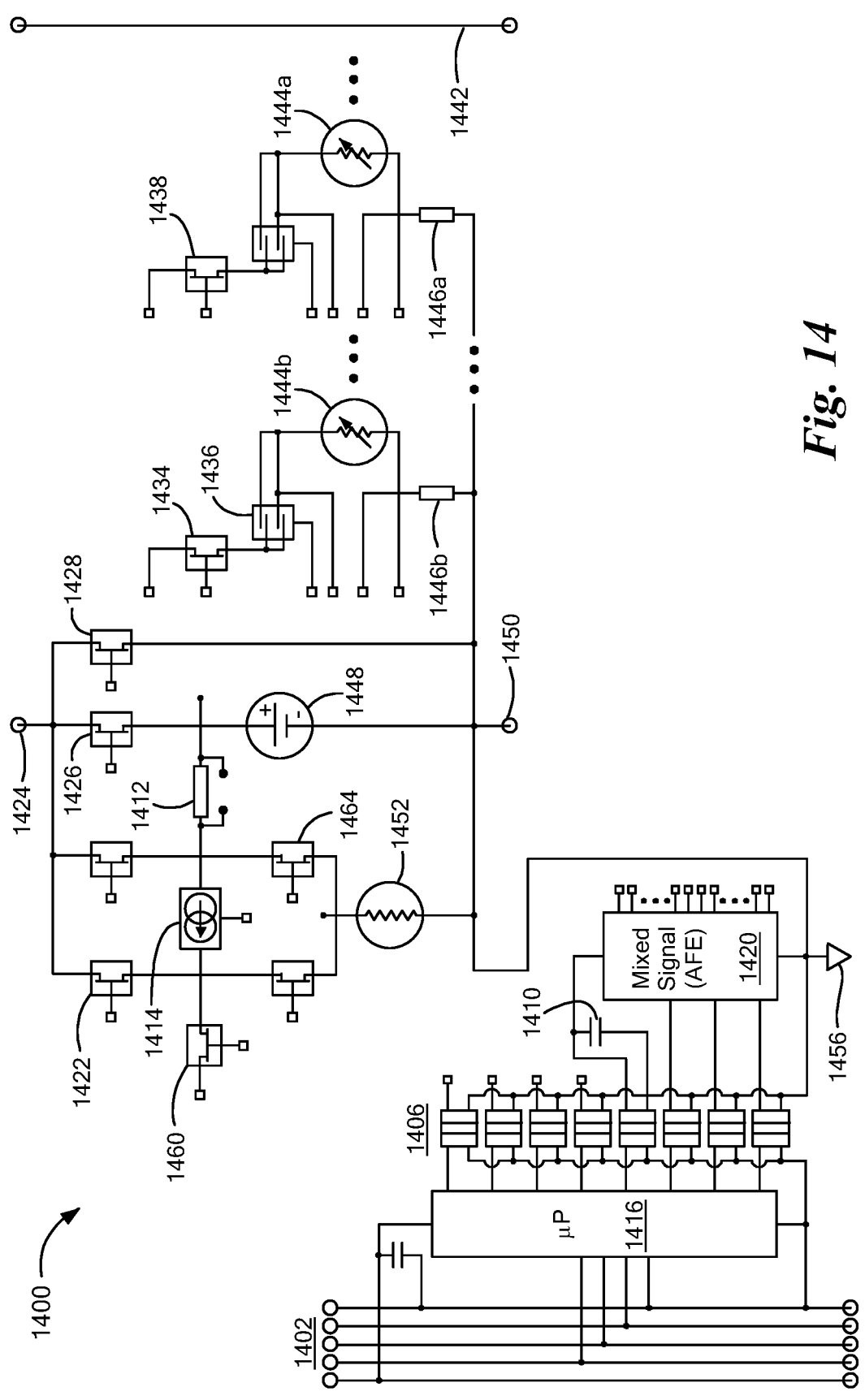
FIG. 14 is a circuit diagram of a cell management system for monitoring and controlling an individual cell, according to some embodiment.

FIG. 14 shows the circuit topology of the cell management 1400. The schematic drawing includes standard circuit blocks used in battery management systems to provide robust performance when drawing power from the batteries it is controlling, minimizing power draw, and compensating for temperature and cell ageing effects. The various circuit elements include, but are not limited to: an internal bus 1402; an isolator and optical transformer bank 1408; a controller side power cap and load side power cap 1410; a current sense resistor 1412; a bidirectional current regulator 1414; a cell positive terminal 1424; an in-line switch 1426 to add the cell output to a series cell string; an in-line switch 1422 to add the cell output to a parallel band of cells; an active bypass switch 1428; passive discharge bypass diodes voltage taps for measuring the thin-film embedded resistive temperature detector (RTD) and resistive strain detector (RSD) using for instance an architecture used in commercial devices such as the Analog Devices AD7193 RSD (n) enable switch 1434; a RTD (n) calibration toggle switch 1436; a RSD (n) enable switch 1438; a RSD (n) calibration toggle switch; a RSD (n) 1444a, 1444b; a RSD (n) reference resistor 1446a, 1446b; a cell 1448; a cell negative terminal 1450; the embedded thin film resistive heater 1452 fabricated over the cell; CMS mixed signal circuitry; a local ground 1456; and a ground pass through 1442.

Further, the circuitry may include a digital microcontroller 1416 which exchanges control and status information with the battery management system through the internal bus 1402 which can include signal and power lines but not limited to: external heater; power feeder; data bus, or separate receive (RX) and transmit (TX) lines; clock (CLK); reset signal, and grounding line. The digital microcontroller 1416 also interfaces with a mixed signal microcontroller with analog front end (AFE) circuitry which includes one or more analog to digital converters, digital to analog converters, buffers, and amplifiers, and temperature compensation circuitry. buffers, and amplifiers, and temperature compensation circuitry. In practice not all features are necessarily integrated. Cells in series connected strings do not require analog switches 1422, while parallel connected cells do not require analog switch 1428. Passive bypasses diodes would defeat the use of an active bypass switch.

In the most robust implementation, the microcontroller 1416 is galvanically isolated from the signals on the load side to protect against transients on the load side, even if the all electrical components in the entire power system can share a common ground. Also, the AFE can be powered directly off the cell, but exposes the underlying circuitry to load transients. In the most robust implementation, the power is coupled optically from the control side using an optical transformer. Power can also be coupled inductively or electrostatically with appropriate modulation and rectification circuitry.

Several different operational modes are described below. During the charging of a cell in a series connected string, current is diverted through the current sense resistor 1412 and passed through to resistive thin-film heater fabricated over the cell by enabling switch 1464 when the cell voltage exceeds the target voltage level. A separate resistor fabricated in one of the metallization layers over the integrated circuit may also be used. Alternatively, the current can be diverted through both the current sense resistor 1412 and current regulator 1414 to enable more sophistical charging profiles to be used. For parallel connected cells, the charging current can be fed directly through switch or switch 1422 through the current regulator 1414 and current sense resistor 1412 to allow more sophisticated charging profiles to be utilized at the individual cell level.

To self-heat the cell at controlled rates, current is also passed through sense resistor 1412 and current regulator 1414.

Electrical impedance measurements can be performed at the cell level which is increasingly being used to evaluate the long term operational state of electrochemical systems such as batteries. Under coordination from the BMS, EIS measurements can be performed when the cell is also bypassed during charging conditions. To perform the measurement, an AC voltage is generated by the analog front end circuitry and fed through switch 1460, bidirectional current regulator, and sense resistor 1412. By measuring the resulting voltage and current levels across the cell, and the phase relationship between the drive signal and current response, the complex impedance can be ascertained.

Resistance changes in the thin film temperature 1444a and strain sensors 1444b are measured by generating a reference current level in the AFE, and comparing the voltage changes as the current is passed through different paths through the sense and reference resistor 1446a and 1446b. Capacitive sensors may also be employed using AC waveforms to extract temperature and strain from changes in the dielectric properties between the fingers.

Although reference is made herein to particular materials, it is appreciated that other materials having similar functional and/or structural properties may be substituted where appropriate, and that a person having ordinary skill in the art would understand how to select such materials and incorporate them into embodiments of the concepts, techniques, and structures set forth herein without deviating from the scope of those teachings.

Various embodiments of the concepts, systems, devices, structures and techniques sought to be protected are described herein with reference to the related drawings. Alternative embodiments can be devised without departing from the scope of the concepts, systems, devices, structures and techniques described herein. It is noted that various connections and positional relationships (e.g., over, below, adjacent, etc.) are set forth between elements in the following description and in the drawings. These connections and/or positional relationships, unless specified otherwise, can be direct or indirect, and the described concepts, systems, devices, structures and techniques are not intended to be limiting in this respect. Accordingly, a coupling of entities can refer to either a direct or an indirect coupling, and a positional relationship between entities can be a direct or indirect positional relationship.

Furthermore, it should be appreciated that relative, directional or reference terms (e.g. such as "above," "below," "left," "right," "top," "bottom," "vertical," "horizontal," "front," "back," "rearward," "forward," etc.) and derivatives thereof are used only to promote clarity in the description of the figures. Such terms are not intended as, and should not be construed as, limiting. Such terms may simply be used to facilitate discussion of the drawings and may be used, where applicable, to promote clarity of description when dealing with relative relationships, particularly with respect to the illustrated embodiments. Such terms are not, however, intended to imply absolute relationships, positions, and/or orientations. For example, with respect to an object or structure, an "upper" or "top" surface can become a "lower" or "bottom" surface simply by turning the object over. Nevertheless, it is still the same surface and the object remains the same. Also, as used herein, "and/or" means "and" or "or," as well as "and" and "or." Moreover, all patent and non-patent literature cited herein is hereby incorporated by references in their entirety.

As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s). The following definitions and abbreviations are to be used for the interpretation of the claims and the specification. As used herein, the terms "comprises," "comprising, "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance, or illustration. Any embodiment or design described herein as "exemplary" is not necessarily to be construed as preferred or advantageous over other embodiments or designs. The terms "one or more" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment, "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal, "top," "bottom," and derivatives thereof shall relate to the described structures and methods, as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. A battery cell structure, comprising:
a first and a second backplane each having:
  an anode;
  a current collection layer in contact with the anode;
  a sensing layer having one or more conductive traces with resistance responsive to temperature and physical stress on the battery cell structure;
  a stress and thermal management layer for managing heat flow and compressive stresses on the battery cell structure; and
  one or more vias extending from a first surface of the backplane to a second, opposite surface of the backplane;
a middle layer disposed between the first and second backplanes and separated therefrom by ion conducting layers, the middle layer having:
  a first cathode and a second cathode disposed on opposite sides of a shared electrode; and
  a plurality of conductive pads configured to electrically connect the one or more vias of the first backplane to the one or more vias of the second backplane forming continuous data and power buses through the battery cell structure; and
a cell management circuit electrically coupled to the current collection layers and the sensing layers, and configured to:
  measure voltage, current, and impedance from the current collection layers; and
  measure temperature and physical stress on the battery cell structure via the sensing layers.

2. The battery cell structure of claim 1, wherein the plurality of conductive pads includes one or more conductive pads configured to electrically connect the shared electrode to the one or more vias on the first backplane, the one or more vias on the second backplane, or both.

3. The battery cell structure of claim 1, further comprising heating layers on the first and second backplanes, wherein the cell management circuit is further configured to route battery cell output power to the heating layers.

4. The battery cell structure of claim 1, wherein the cell management circuit is further configured to communicate the voltage, current, impedance, temperature and stress measurements to a battery management system (BMS) via the data bus.

5. The battery cell structure of claim 1, wherein the cell management circuit is configured to connect or disconnect the cell from the power bus.

6. The battery cell structure of claim 1, wherein at least one of the stress and thermal management layers comprises a lattice structure filled with a phase change material to regulate the temperature of the battery cell structure.

7. The battery cell structure of claim 1, wherein at least one of the stress and thermal management layers further comprises flexible corrugated portions to maintain contact between the backplanes and the middle layer as the cathodes and anodes expand or contract during charge cycling.

8. A battery system, comprising:
a plurality of cell structures connected via a data bus and a power bus and each having:
  a first and a second backplane each having:
    an anode;
    a current collection layer in contact with the anode;

a sensing layer having one or more conductive traces with resistance responsive to temperature and physical stress on the cell structure;
    a stress and thermal management layer for managing heat flow and compressive stresses on the cell structure; and
    one or more vias extending from a first surface of the backplane to a second, opposite surface of the backplane;
  a middle layer disposed between the first and second backplanes and separated therefrom by ion conducting layers, the middle layer having:
    a first cathode and a second cathode disposed on opposite sides of a shared electrode; and
    a plurality of conductive pads configured to electrically connect the one or more vias of the first backplane to the one or more vias of the second backplane forming continuous portions of the data and power buses through the cell structure; and
  a cell management circuit electrically coupled to the current collection layers and the sensing layers, and configured to:
    measure voltage, current, and impedance from the current collection layers; and
    measure temperature and physical stress on the cell structure via the sensing layers.

9. The battery system of claim 8, wherein, for at least one of the cell structures, the plurality of conductive pads includes one or more conductive pads configured to electrically connect the shared electrode to the one or more vias on the first backplane, the one or more vias on the second backplane, or both.

10. The battery system of claim 8, wherein at least one of the cell structures further comprises heating layers on the first and second backplanes, wherein the cell management circuit is further configured to route power of the cell structure to the heating layers.

11. The battery system of claim 8, wherein, for at least one of the cell structures, the cell management circuit is configured to regulate current collection layer voltage or current.

12. The battery system of claim 8, further comprising a battery management system (BMS), wherein for each of the cell structures, the cell management circuit is further configured to communicate the voltage, current, impedance, temperature and stress measurements to the BMS via the data bus.

13. The battery system of claim 12, further comprising a structure to house and provide compressive force on two or more of the plurality of cell structures.

14. The battery system of claim 13, wherein the housing structure has a circular geometry.

15. The battery system of claim 8, wherein two or more of the plurality of cell structures are arranged as sectors on a circular layer and electrically connected in series.

16. The battery system of claim 8, further comprising a plurality of layers with each layer comprising two or more of the plurality of cell structures electrically connected in series.

17. The battery system of claim 16, wherein the plurality of layers are electrically connected in series or parallel.

18. The battery system of claim 8, further comprising circuitry to cycle ones of the plurality of cell structures in or out of the power bus to regulate output voltage of the battery system.

19. The battery system of claim 8, further comprising circuitry to cycle ones of the plurality of cell structures in or out of the data bus, power bus, or both to bypass faults.

20. The battery system of claim 8, wherein at least two different ones of the cell structures have different capacities, discharge rates, or temperature windows.

\* \* \* \* \*